(12) United States Patent
Zueski et al.

(10) Patent No.: US 11,994,198 B1
(45) Date of Patent: May 28, 2024

(54) AXLE ASSEMBLY HAVING A PRELOAD MECHANISM

(71) Applicant: ArvinMeritor Technology, LLC, Troy, MI (US)

(72) Inventors: David M Zueski, Troy, MI (US); Thomas Johns, Troy, MI (US); Brian Hayes, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/329,243

(22) Filed: Jun. 5, 2023

(51) Int. Cl.
| | |
|---|---|
| *F16H 48/42* | (2012.01) |
| *F16H 57/022* | (2012.01) |
| *F16H 57/037* | (2012.01) |
| F16H 48/06 | (2006.01) |
| F16H 57/08 | (2006.01) |

(52) U.S. Cl.
CPC ........... *F16H 48/42* (2013.01); *F16H 57/022* (2013.01); *F16H 57/037* (2013.01); *F16C 2229/00* (2013.01); *F16H 48/06* (2013.01); *F16H 2048/423* (2013.01); *F16H 2048/426* (2013.01); *F16H 2057/0221* (2013.01); *F16H 2057/085* (2013.01)

(58) Field of Classification Search
CPC .. F16H 2048/426; F16H 48/42; F16H 57/022; F16H 2048/423; F16H 2057/0221; F16C 2229/00
See application file for complete search history.

(56) References Cited

U.S. PATENT DOCUMENTS

| | | | | |
|---|---|---|---|---|
| 753,022 | A * | 2/1904 | White | F16H 48/08 180/905 |
| 792,690 | A * | 6/1905 | Brush | F16H 48/08 475/230 |
| 3,715,936 | A * | 2/1973 | Jones | F16C 19/547 475/246 |
| 4,657,412 | A * | 4/1987 | McLarty | F16C 35/12 384/624 |
| 4,984,910 | A * | 1/1991 | Cogno | F16C 19/56 384/583 |
| 5,046,870 | A * | 9/1991 | Ordo | F16C 25/06 384/583 |
| 6,474,873 | B1 * | 11/2002 | Krisher | F16C 25/06 384/583 |
| 6,532,660 | B1 * | 3/2003 | Bear | F16C 25/06 29/893 |
| 10,208,846 | B2 | 2/2019 | Chinitz | |
| 10,316,950 | B2 | 6/2019 | Chinitz et al. | |
| 2019/0054816 | A1 | 2/2019 | Garcia et al. | |
| 2019/0054817 | A1 | 2/2019 | Garcia et al. | |
| 2019/0054818 | A1 | 2/2019 | Garcia et al. | |
| 2020/0173494 | A1 | 6/2020 | Smith et al. | |
| 2020/0173531 | A1 | 6/2020 | Smith | |

(Continued)

*Primary Examiner* — Sherry L Estremsky
(74) *Attorney, Agent, or Firm* — Brooks Kushman PC

(57) ABSTRACT

An axle assembly having a preload mechanism. The preload mechanism engages a bearing assembly and includes a preload element and an adjuster element. The preload element is disposed inside a housing and is rotatable about an axis. The adjuster element engages the preload element and is moveable to actuate the preload element and exert a preload force on a bearing assembly. The adjuster element is accessible from outside of the housing.

27 Claims, 15 Drawing Sheets

(56) References Cited

U.S. PATENT DOCUMENTS

2020/0173535 A1 6/2020 Peng et al.
2020/0173537 A1 6/2020 Begov et al.
2020/0173541 A1 6/2020 Soffner et al.
2020/0177049 A1 6/2020 Raya et al.
2020/0177059 A1 6/2020 Smith et al.
2022/0212498 A1 7/2022 Raya

* cited by examiner

AXLE ASSEMBLY HAVING A PRELOAD MECHANISM

TECHNICAL FIELD

This relates to an axle assembly that has a preload mechanism that has an adjuster element that actuates a preload element to exert a preload force on a bearing assembly.

BACKGROUND

An axle assembly having a drive pinion and a bearing preload element is disclosed in U.S. Pat. No. 10,316,950.

SUMMARY

In at least one embodiment an axle assembly is provided. The axle assembly includes a housing, a shaft, a bearing assembly, and a preload mechanism. The shaft is rotatable about an axis. The shaft is disposed in the housing. The bearing assembly encircles the shaft. The bearing assembly rotatably supports the shaft on the housing. The preload mechanism engages the bearing assembly. The preload mechanism includes a preload element and an adjuster element. The preload element is disposed inside the housing. The preload element is rotatable about the axis. The adjuster element engages the preload element. The adjuster element is moveable along an adjuster element axis to actuate the preload element and exert a preload force on the bearing assembly. The adjuster element axis differs from the axis. The adjuster element is disposed in a hole in the housing. The adjuster element is accessible from outside the housing.

The preload element may be spaced apart from the shaft. The preload element may not contact the shaft.

The housing may be a differential carrier. The shaft may be part of a drive pinion.

The axle assembly may include a second bearing assembly. The second bearing assembly may encircle the shaft. The second bearing assembly may rotatably support the shaft on the housing. The preload element may be positioned along the axis between the bearing assembly and the second bearing assembly. The preload element may engage an outer race of the bearing assembly.

The adjuster element axis may be disposed substantially perpendicular to the axis. The adjuster element may be moveable along the adjuster element axis to actuate the preload element when the adjuster element is rotated about the adjuster element axis. The preload element may encircle the axis.

The preload mechanism may include a retainer. The retainer may inhibit axial movement of the adjuster element. The retainer may inhibit axial movement of the adjuster element when the retainer is received in the hole in the housing.

The retainer may have a thread. The threat may mate with a corresponding thread of the housing. The retainer may engage an end of the adjuster element when the retainer is received in the hole in the housing.

The housing may define a second hole. The second hole may extend from the hole in the housing. The retainer may engage the adjuster element and inhibit axial movement of the adjuster element when the retainer is received in the hole in the housing. The retainer may be received in a recess in the adjuster element when the retainer engages the adjuster element.

The preload element may include a threaded portion. The threaded portion may face away from the axis. The threaded portion may mate with a threaded region of the housing. The preload element may include a toothed portion. The adjuster element may have a drive gear. The toothed portion may mesh with the drive gear of the adjuster element.

The preload mechanism may include a first race. The first race may engage the bearing assembly. The first race may be spaced apart from the preload element. A rotatable bearing element may extend from the preload element to the first race. The first race may include a tab. The tab may extend away from the axis. The tab may be received in a notch in the housing. The tab and the housing may cooperate to inhibit rotation of the first race about the axis in at least one rotational direction when the tab engages the housing. The rotatable bearing element may be received in a groove in the preload element. The rotatable bearing elements may be received in a groove in the first race.

The preload mechanism may include a second race. The preload element may be axially positioned between the first race and the second race.

A second rotatable bearing element may extend from the preload element to the second race. The preload element may be spaced apart from the second race.

The preload mechanism may include a second bearing preload element. The second bearing preload element may be positioned along the axis between the preload element and the bearing assembly.

A first washer may be disposed on an opposite side of the preload element from the second preload element. The first washer may extend from the preload element to the housing.

A second washer may extend from the second preload element to the bearing assembly.

The preload element may have a preload element ramp. The preload element ramp may face toward the second preload element. The second preload element may have a preload element ramp. The preload element ramp of the second preload element may face toward the preload element. Rotation of the preload element may cause the preload element ramp of the preload element to slide along the preload element ramp of the second preload element. Rotation of the preload element may actuate the second preload element along the axis to exert the preload force on the bearing assembly.

The preload element may have a second side. The second side may face away from the second preload element. The ramp may be disposed in a nonparallel relationship with the second side.

The preload element may have a first flat. The preload element may have a second flat. The second flat may be disposed closer to the second side than the first flat is disposed to the second side. The preload element ramp of the preload element may extend from the first flat to the second flat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
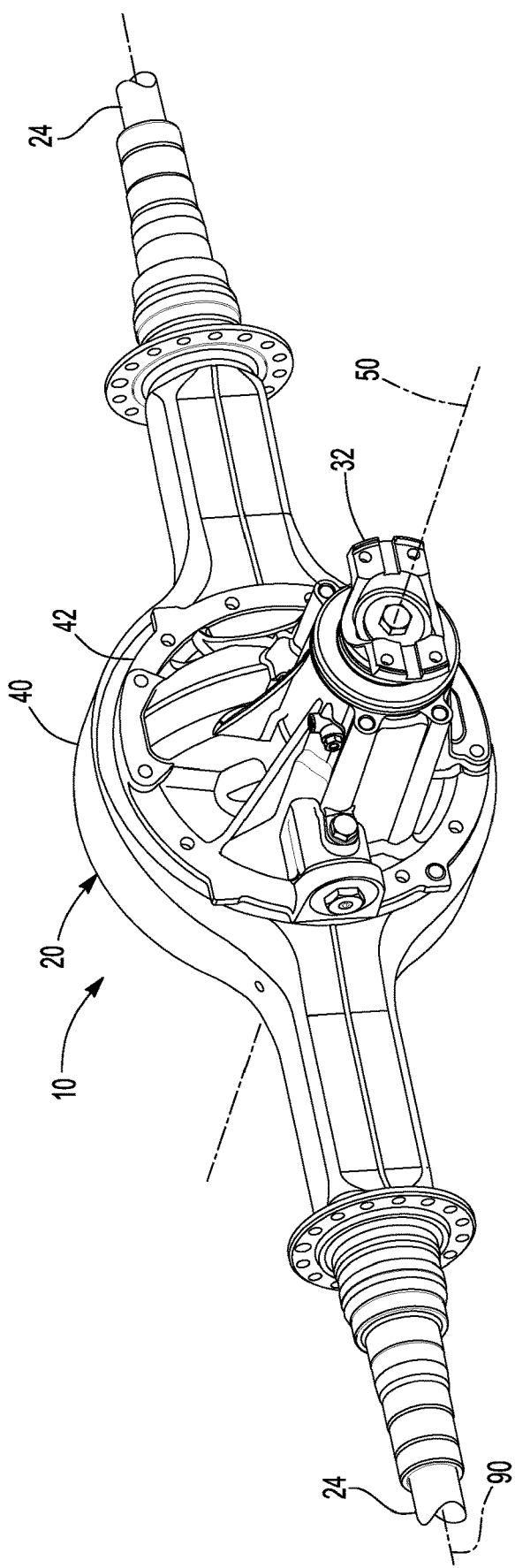
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 is configured to provide torque to one or more traction wheel assemblies that may include a tire mounted on a wheel. The wheel may be mounted to a wheel hub that may be rotatable about a wheel axis.

Figure 2:
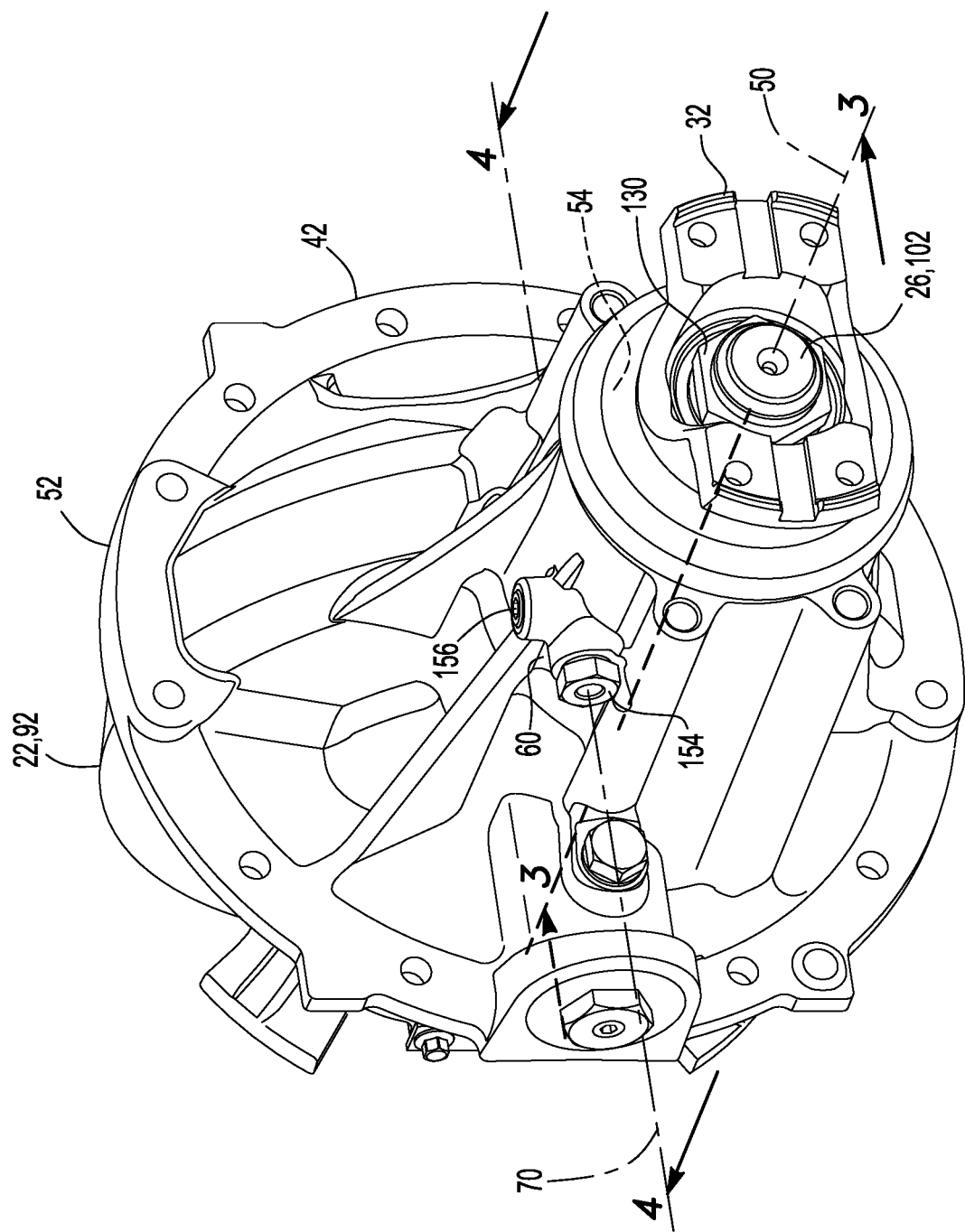
FIG. 2 is a perspective view of a housing of the axle assembly that is configured as a differential carrier.
Figure 3:
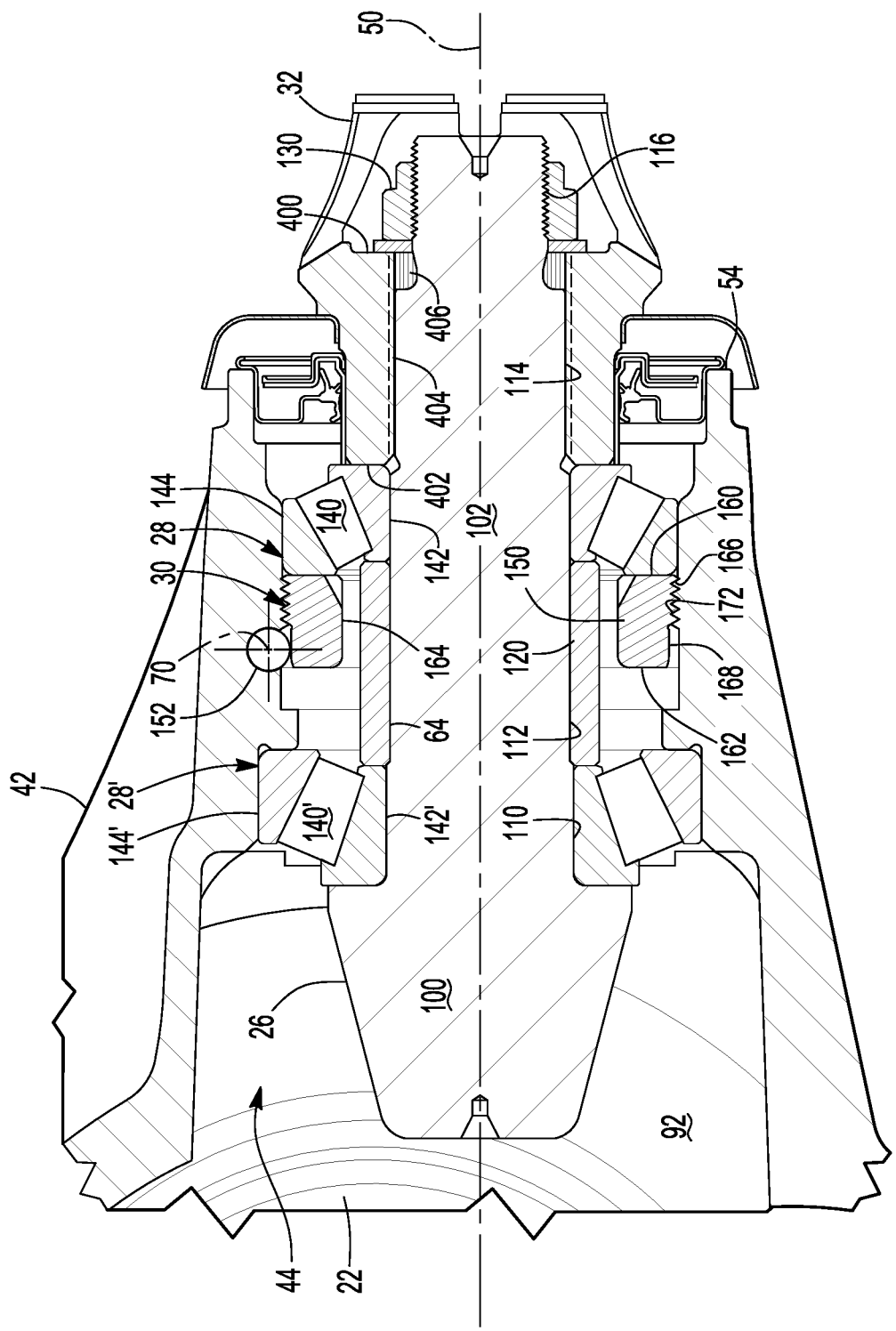
FIG. 3 is a section view along section line 3-3.

One or more axle assemblies may be provided with the vehicle. In FIG. 1, a single axle assembly 10 is shown. As is best shown with reference to FIG. 1 or 2, the axle assembly 10 may include a housing assembly 20, a differential assembly 22, and at least one axle shaft 24. As is best shown in FIG. 3, the axle assembly 10 includes a drive pinion 26, at least one bearing assembly 28, 28', and a preload mechanism 30, 30', or 30", which are best shown in FIGS. 3-5, 7-13, and 14-18, respectively. For convenience in reference, the bearing assemblies 28, 28' may be referred to as a first bearing assembly 28 and a second bearing assembly 28'. The axle assembly 10 may also include a yoke 32.

Referring to FIG. 1, the housing assembly 20 receives various components of the axle assembly 10. In addition, the housing assembly 20 may facilitate mounting of the axle assembly 10 to the vehicle. The housing assembly 20 includes one or more housings. For example, a plurality of housings may be provided that are separate components that are fastened together to form the housing assembly 20. In the configuration shown, the housing assembly 20 includes housings that may be referred to as an axle housing 40 and a differential carrier 42, which is also called a carrier housing. Optionally, one or more additional housings may be provided with the housing assembly 20, such as an electric motor housing if an electric motor is provided with the axle assembly 10. It is contemplated that each housing may be assembled from multiple parts or may be a unitary monolithic component.

The axle housing 40 at least partially receives the differential assembly 22. The axle housing 40 may also have arm portions that receive and support the axle shafts 24.

The differential carrier 42 is removably mountable to the axle housing 40. The differential carrier 42 supports the differential assembly 22. For instance, the differential carrier 42 may include bearing supports upon which bearing assemblies are disposed that rotatably support the differential assembly 22. In at least one configuration and as is best shown in FIG. 3, the differential carrier 42 includes a cavity 44. As is best shown in FIG. 4, the differential carrier 42 may include one more through holes, such as a hole 46, a second hole 48, or both.

Referring to FIG. 3, the cavity 44 is disposed inside the differential carrier 42. The cavity 44 may extend along an axis 50. The cavity 44 may extend from a first end 52, which is best shown in FIG. 2, to a second end 54 of the differential carrier 42. The first end 52 engages and is mountable to the axle housing 40. The second end 54 is disposed opposite the first end 52. For example, the second end 54 may face away from the axle housing 40 and may encircle the drive pinion 26, the yoke 32, or both.

Figure 4:
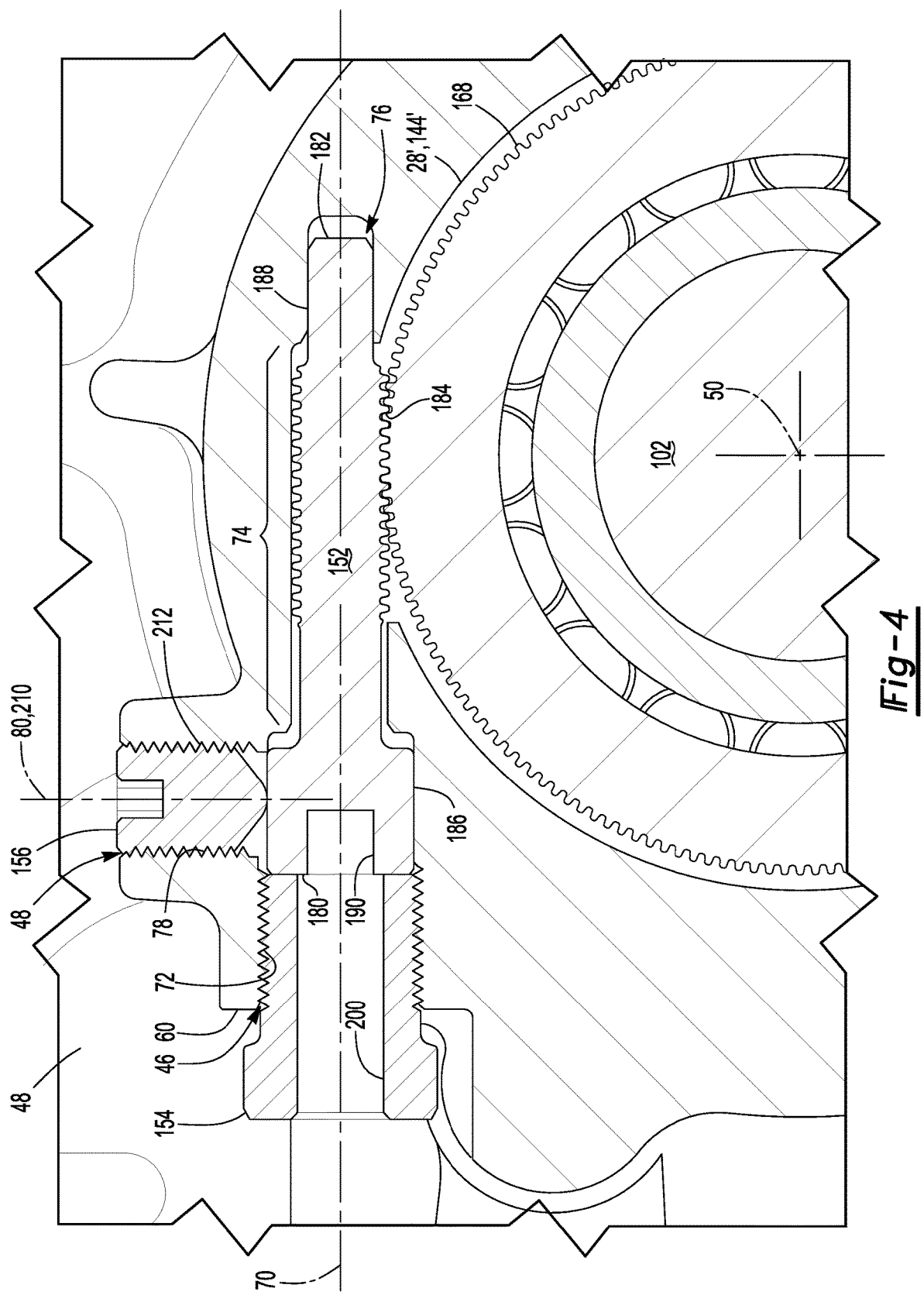
FIG. 4 is a section view along section line 4-4 showing an example of a preload mechanism.

Referring to FIG. 4, the hole 46 is accessible from outside of the differential carrier 42 when the axle assembly 10 is assembled. For instance, the hole 46 may extend from an exterior side 60 of the differential carrier 42 to the cavity 44. The exterior side 60 of the differential carrier 42 may face away from the axis 50. As such, the hole 46 may be a through hole that extends through a wall of the differential carrier 42 to the cavity 44. The hole 46 is not coaxially disposed with the axis 50. In at least one configuration, the hole 46 does not intersect the axis 50.

The hole 46 may extend along an axis that is associated with an adjuster element of the preload mechanism 30. This axis is referred to as an adjuster element axis 70. The adjuster element axis 70 differs from the axis 50.

The hole 46 may be provided in various configurations. In the configuration shown, the hole 46 includes a threaded portion 72, an intermediate portion 74, and a pocket 76.

The threaded portion 72, if provided, may be disposed proximate an end of the hole 46. For instance, the threaded portion 72 may extend from or may be disposed adjacent to the exterior side 60 of the differential carrier 42. The threaded portion 72 may be configured to mate with a retainer 154 of the preload mechanism 30 as will be discussed in more detail below. In at least one configuration, the threaded portion 72 may extend between the exterior side 60 and the second hole 48, if provided.

The intermediate portion 74 may extend between the threaded portion 72 and the cavity 44, the pocket 76, or both. The intermediate portion 74 may receive an adjuster element of the preload mechanism 30 as will be discussed in more detail below. In at least one configuration, the intermediate portion 74 or a portion thereof may have a smaller diameter than the threaded portion 72. The intermediate portion 74 may intersect the cavity 44.

The pocket 76, if provided, may extend from the intermediate portion 74, the cavity 44, or both. For instance, the pocket 76 may extend from the intermediate portion 74 in a direction that extends away from the threaded portion 72. The pocket 76 may be configured as a blind hole and may receive and support an end of the adjuster element of the preload mechanism 30. In at least one configuration, the pocket 76 may have a smaller diameter than the intermediate portion 74.

The second hole 48, if provided, may intersect and extend from the hole 46. In at least one configuration, the second hole 48 may not extend from and may not intersect the cavity 44. The second hole 48 may receive a retainer 156 that may engage the adjuster element to inhibit axial movement of the adjuster element as will be discussed in more detail below. The second hole 48 may extend along an axis, which may be referred to as a second hole axis 80. The second hole axis 80 may intersect the hole 46 and may optionally intersect the adjuster element axis 70. The second hole axis 80 may not be coaxially disposed with the axis 50, the adjuster element axis 70, or both. In at least one configuration, the second hole axis 80 may be disposed substantially perpendicular to the adjuster element axis 70. The term "substantially perpendicular" is used herein to designate features or axes that are the same as or very close to perpendicular and includes features that are within ±3° of being perpendicular each other. The second hole axis 80 may also be disposed substantially perpendicular to the axis 50. It is contemplated that the second hole axis 80 may not intersect the axis 50. In at least one configuration, the second hole 48 may have a threaded portion 78 that may be configured to mate with a retainer of the preload mechanism 30 as will be discussed in more detail below.

Referring primarily to FIG. 2, the differential assembly 22 is receivable inside the housing assembly 20. For instance, the differential assembly 22 may be received inside the axle housing 40 and the differential carrier 42. The differential assembly 22 may be rotatable about a differential axis 90, which is best shown in FIG. 1, and may transmit torque to the axle shafts 24 and wheels. In at least one configuration, the differential axis 90 may be disposed substantially perpendicular to the axis 50. The differential assembly 22 may be operatively connected to the axle shafts 24 and may permit the axle shafts 24 to rotate at different rotational speeds in a manner known by those skilled in the art. The differential assembly 22 may have a ring gear 92 that may have teeth the mate or mesh with the teeth of a gear of the drive pinion 26. Accordingly, the differential assembly 22 may receive torque from the drive pinion 26 via the ring gear 92 and transmit torque to the axle shafts 24.

Referring to FIG. 1, the axle shafts 24 transmit torque between the differential assembly 22 and corresponding wheel hubs and wheels. Two axle shafts 24 may be provided such that each axle shaft 24 extends through a different arm portion of the axle housing 40. The axle shafts 24 or a portion thereof may extend along and may be rotatable about an axis, such as the differential axis 90 or an axis that differs from the differential axis 90. Each axle shaft 24 may have a first end and a second end. The first end may be operatively connected to the differential assembly 22. The second end may be disposed opposite the first end and may be operatively connected to a wheel, such as via a wheel hub. Optionally, gear reduction may be provided between an axle shaft 24 and a wheel.

Referring primarily to FIGS. 3 and 4, the drive pinion 26 is configured to transmit torque between a power source, which may also be called a torque source, and the differential assembly 22 via the ring gear 92. The power source may be of any suitable type. For instance, the power source may be an electrical power source or a non-electrical power source. An example of an electrical power source is an electrical machine like an electric motor. An example of a non-electrical power source is an internal combustion engine. The power source may be provided with the axle assembly 10 or may be located remotely from the axle assembly 10. For instance, a power source that is remotely positioned from the axle assembly 10 may be operatively connected to the axle assembly 10 via a linkage like a shaft. The drive pinion 26 is disposed in the cavity 44. The drive pinion 26 is not disposed in the hole 46 or the second hole 48.

The drive pinion 26 is rotatable about the axis 50. The drive pinion 26 may extend along or around the axis 50. In at least one configuration, the drive pinion 26 includes a gear 100 and a shaft 102.

The gear 100 may be disposed at or near an end of the shaft 102. The gear 100 may have a plurality of teeth that may mate with corresponding teeth on the ring gear 92. The teeth of the ring gear 92 and the gear 100 are simplified or not shown in the figures, but it is to be understood that the teeth of the gear 100 may have any suitable configuration that is compatible with the teeth of the ring gear 92, including but not limited to spiral teeth, hypoid teeth, etc., as is known by those skilled in the art. The gear 100 may be integrally formed with the shaft 102 or may be provided as a separate component that may be fixedly disposed on the shaft 102.

The shaft 102 extends from the gear 100. For instance, the shaft 102 may extend from the gear 100 in a direction that extends away from the differential assembly 22. The shaft 102 is at least partially disposed in the housing. For instance, the shaft 102 may be disposed in the cavity 44 of the differential carrier 42. The shaft 102 is rotatable about the axis 50. In at least one configuration such as is best shown with reference to FIG. 3, the shaft 102 may include at least one outer surface, such as a first outer surface 110 and/or a second outer surface 112, a spline 114, and a threaded portion 116.

Referring to FIG. 3, the first outer surface 110 may extend from the gear 100 and may be an outside circumference of a portion of the shaft 102. As such, the first outer surface 110 may face away from the axis 50. One or more bearing assemblies 28, 28' that rotatably support the drive pinion 26 may be disposed in the cavity 44 and may be disposed on the first outer surface 110.

The second outer surface 112, if provided, may be axially positioned or positioned along the axis 50 between the first outer surface 110 and the threaded portion 116. The second outer surface 112 may be an outside circumference of a portion of the shaft 102. As such, the second outer surface 112 may face away from the axis 50. The second outer surface 112 may have a smaller diameter than the first outer surface 110. A spacer 120 may be disposed on the second outer surface 112. The spacer 120 may be configured as a ring that may encircle the shaft 102 and may be axially positioned between and extend between the inner races of the bearing assemblies 28, 28' to inhibit axial movement of the inner races toward each other. The spacer 120 may facilitate the transmission of preload force between the bearing assemblies 28, 28'.

It is contemplated that the second outer surface 112 may be omitted. For instance, the axial length of the first outer surface 110 may be increased and the second bearing assembly 28', the spacer 120, or both may be disposed on the first outer surface 110. It is also contemplated that additional outer surfaces may be provided. For instance, the second bearing assembly 28' may be disposed on a third outer surface that may extend between the second outer surface 112 and the spline 114.

The spline 114, if provided, may be axially positioned between the first outer surface 110 and the threaded portion 116. In the configuration shown, the spline 114 is axially positioned between the second outer surface 112 and the threaded portion 116. The spline 114 may include a plurality of teeth. In at least one configuration, the teeth of the spline 114 may extend away from the axis 50, may be disposed substantially parallel to the axis 50, and may mate with a corresponding spline of another component, such as the yoke 32, that may operatively connect the drive pinion 26 to the power source. The spline 114 may have an outside diameter that may be less than the diameter of the outside diameter of the first outer surface 110, the second outer surface 112, or both. It is also contemplated that the spline 114 may be omitted.

The threaded portion 116, if provided, facilitates installation of a nut 130 that inhibits axial movement of the yoke 32. The threaded portion 116 may be axially positioned or positioned along the axis 50 between an outer surface and a distal end of the shaft 102. In the configuration shown, the threaded portion 116 is axially positioned between the spline 114 and the distal end of the shaft 102. The threaded portion 116 may include a thread that may spiral around the axis 50 and mate or mesh with a corresponding thread of the nut 130. The nut cooperates with the spacer 120 to hold the inner race of the bearing assembly 28 in a desired axial position. The nut 130 is not a preload nut and may not be used to adjust or set the preload force on one or more bearing assemblies 28, 28' as will be discussed in more detail below. In at least one configuration, the threaded portion 116 may have an outside diameter that may be smaller than the diameter of the first outer surface 110, the second outer surface 112, the spline 114, or combinations thereof.

The bearing assemblies 28, 28' rotatably support the drive pinion 26 on a housing, such as the differential carrier 42. For instance, the bearing assemblies 28, 28' may be disposed in the cavity 44 and may extend from the housing to the drive pinion 26. The bearing assemblies 28, 28' may encircle the axis 50 and the shaft 102 of the drive pinion 26. In addition, the bearing assemblies 28, 28' may be positioned along the axis 50 such that the bearing assemblies 28, 28' are spaced apart from each other.

The bearing assemblies 28, 28' may have any suitable configuration. For instance, a bearing assembly 28 may be configured as a roller bearing assembly that may include a plurality of rolling elements 140 that may be disposed between an inner race 142 and an outer race 144. For example, the inner race 142 may encircle the shaft 102 while the outer race 144 may encircle the rolling elements 140 and the inner race 142. In the configuration shown, two bearing assemblies are provided and may be referred to as a first bearing assembly 28 and a second bearing assembly 28' for clarity. The second bearing assembly 28' and its components are designated with the same reference numbers as the first bearing assembly 28 but include a prime symbol (') after the number. Thus, the second bearing assembly 28' includes rolling elements 140', an inner race 142', and an outer race 144' that are analogous to the corresponding components of the first bearing assembly 28.

The inner races 142, 142' of the bearing assemblies 28, 28' extend around and may engage or contact the shaft 102. For instance, the inner races 142, 142' may engage or contact a common outer surface of the shaft 102 or different outer surfaces of the shaft 102. In the configuration shown, the inner race 142' is disposed on the first outer surface 110 while the inner race 142 is disposed on the second outer surface 112. The inner races 142, 142' and may be spaced apart from each other. The spacer 120 may extend from one inner race 142 to the other inner race 142'.

The outer races 144, 144' of the bearing assemblies 28, 28' may extend from the housing. The outer races 144, 144' and may be spaced apart from each other.

The preload mechanism 30, 30', 30" is configured to apply or exert a desired preload force against one or more bearing assemblies 28, 28'. The preload force may be an axial preload force that is applied or exerted in a direction that extends along the axis 50. Applying or exerting a desired axial preload force may help inhibit or prevent spinning of the inner race 142, 142' with respect to the shaft 102, may help inhibit or prevent spinning of the outer race 144, 144' with respect to the housing, may inhibit or prevent skidding of the rolling elements 140, 140' along an inner or outer race of a bearing assembly (in contrast to a bearing element rolling along inner and outer races of a bearing assembly), and remove excess play in the bearing assembly, which may result in reduced bearing life.

The preload mechanism 30, 30', 30" will primarily be discussed in the context of being provided with a housing that is configured as a differential carrier 42 and in the context of exerting a preload force on one or more bearing assemblies 28, 28' that rotatably support the drive pinion 26; however, it is to be understood that the preload mechanism 30, 30', 30" may be associated with other housings and may be configured to exert a preload force on one or more bearing assemblies that rotatably support a shaft that is not part of the drive pinion 26.

Three different preload mechanism configurations are discussed below. In each configuration, the preload mechanism 30 engages a bearing assembly. In the configurations shown, the preload mechanism 30, 30', 30" is depicted as contacting or engaging the first bearing assembly 28; however, the preload mechanism 30, 30', 30" may contact or engage a different bearing assembly, such as the second bearing assembly 28' in other configurations. The preload mechanism 30, 30', 30" may be axially positioned between the first bearing assembly 28 and the second bearing assembly 28'. In each configuration, the preload mechanism 30, 30', 30" includes a preload element 150, 150', or 150" and an adjuster element 152 or 152'. Optionally, the preload mechanism 30, 30', 30" may include one or more retainers, such as a first retainer 154, a second retainer 156, or both.

Referring to FIGS. 2-5, a first configuration of the preload mechanism 30 will now be discussed. As is best shown with reference to FIGS. 3 and 4, the preload element 150 is disposed inside the housing, such as completely disposed in the cavity 44 of the differential carrier 42. The preload element 150 may be positioned along the axis 50 between the first bearing assembly 28 and the second bearing assembly 28'. The preload element 150 is rotatable about the axis 50. The preload element 150 may encircle the axis 50, the shaft 102, the spacer 120, or combinations thereof. The preload element 150 may engage the outer race of a bearing assembly. In the configuration shown, the preload element 150 engages the outer race 144 of the first bearing assembly 28.

Figure 5:
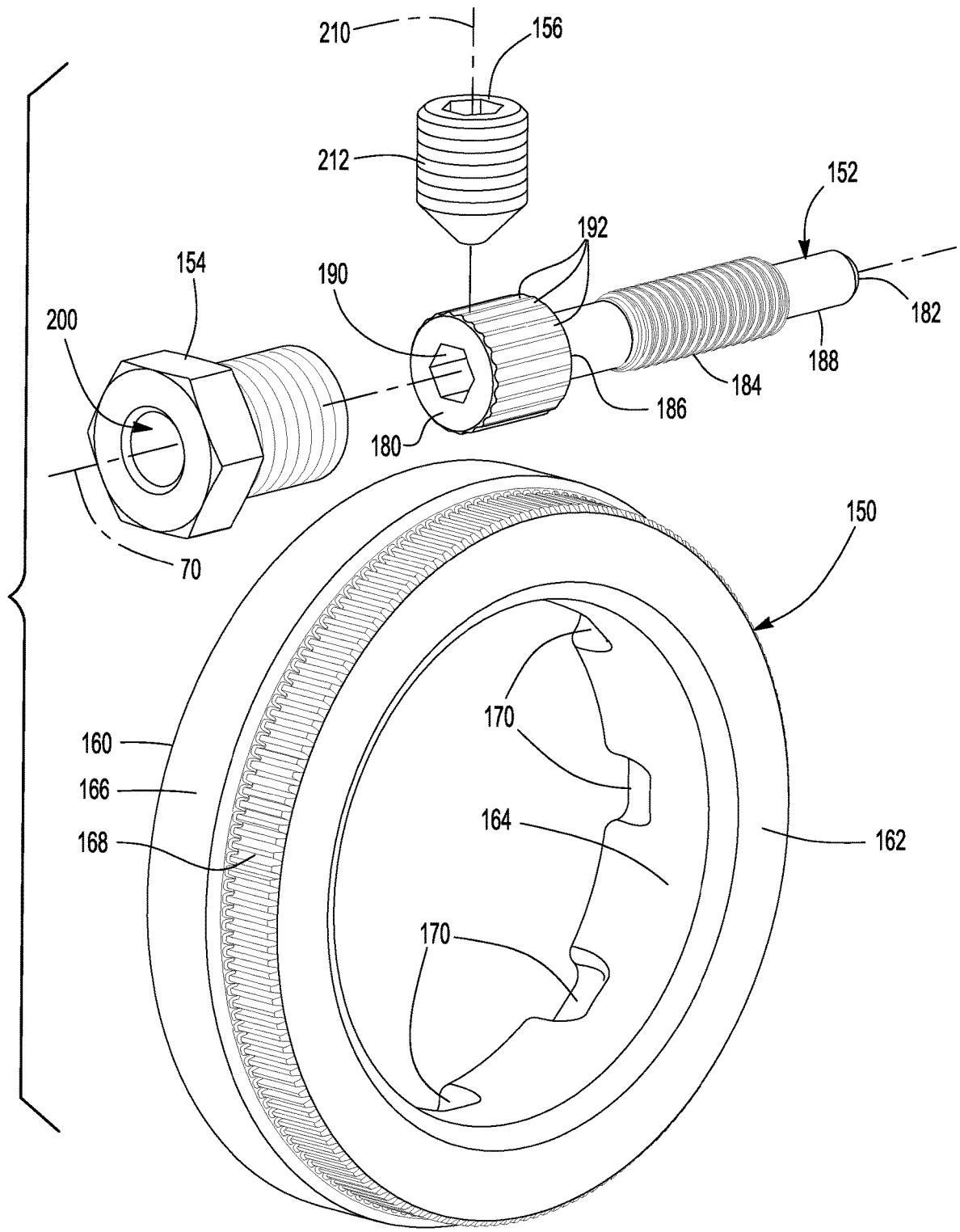
FIG. 5 is an exploded view of the preload mechanism shown in FIG. 4.

Referring primarily to FIGS. 3 and 5, the preload element 150 includes a first side 160, a second side 162, and inner side 164, a threaded portion 166, and a toothed portion 168.

The first side 160 may face toward the first bearing assembly 28. The first side 160 may contact or engage the first bearing assembly 28. For instance, the first side 160 may contact or engage the outer race 144 of the first bearing assembly 28. In at least one configuration, the first side 160 may be disposed substantially perpendicular to the axis 50. Optionally, one or more engagement features 170 may extend from the first side 160, the inner side 164, or both as is best shown in FIG. 5. The engagement features 170 may be configured as recesses, protrusions, or combinations thereof that may be engaged by a tool, such as a driver or a wrench, to facilitate installation and threading of the preload element 150 into the housing.

The second side 162 is disposed opposite the first side 160. As such, the second side 162 may face away from the first bearing assembly 28. The second side 162 may be spaced apart from the first side 160.

The inner side 164 faces toward the axis 50. The inner side 164 may extend between the first side 160 and the second side 162. For example, the inner side 164 may extend from the first side 160 to the second side 162. In at least one configuration, the inner side 164 may extend around and may be spaced apart from the spacer 120.

The threaded portion 166 is disposed opposite the inner side 164. For example, the threaded portion 166 may face away from the axis 50. The threaded portion 166 may be axially positioned between the first side 160 and the second side 162. For instance, the threaded portion 166 may extend from the first side 160 toward the second side 162. The threaded portion 166 may mate with a threaded region 172 of the housing. The threaded region 172 of the housing may face toward the axis 50 and may be axially positioned between the first bearing assembly 28 in the second bearing assembly 28'.

Referring primarily to FIGS. 4 and 5, the toothed portion 168 may also be disposed opposite the inner side 164. As such, the toothed portion 168 may face away from the axis 50. Optionally, the toothed portion 168 or a portion thereof may be disposed closer to the axis 50 than the threaded portion 166 is disposed to the axis 50. The toothed portion 168 may be axially positioned between the first side 160 and the second side 162. For instance, the toothed portion 168 may extend from the second side 162 toward the first side 160. The toothed portion 168 may include a plurality of teeth that may be arranged in a repeating pattern at least partially around the axis 50. The teeth of the toothed portion 168 may mate or mesh with a corresponding drive gear of the adjuster element 152 as will be discussed more in more detail below.

The adjuster element 152 engages the preload element 150 and is configured to actuate the preload element 150 to exert a preload force on at least one bearing assembly 28, 28'. The adjuster element 152 is moveable with respect to the adjuster element axis 70. For instance, the adjuster element 152 may rotate about or translate along the adjuster element axis 70, which in turn exerts force on the preload element 150 and may actuate the preload element 150. It is contemplated that the adjuster element 152 may rotate about the adjuster element axis 70 without translating along the adjuster element axis 70 and that rotation of the adjuster element 152 may in turn exert force on the preload element 150.

The adjuster element 152 is disposed in the hole 46 in the housing. In addition, the adjuster element 152 is accessible from outside of the housing. More specifically, the adjuster element 152 is accessible from outside of the housing and is actuatable from outside of the housing when the drive pinion 26 and the bearing assembly 28, 28' are disposed in the cavity 44 and mounted to the housing with the preload element 150 positioned along the axis 50 therebetween such as is shown in FIG. 3. In other words, the adjuster element 152 is not accessed via the cavity 44. The adjuster element 152 is also spaced apart from and does not contact the shaft 102. Moreover, the adjuster element 152 may be actuatable when the yoke 32 is installed on the shaft 102 and secured with the nut 130. In the configuration shown, the adjuster element 152 may include a first end 180, a second end 182, a drive gear 184, a head 186, a guide portion 188, or combinations thereof.

The first end 180 may be disposed in the hole 46 or may optionally be disposed outside of the hole 46 and the housing. The first end 180 may be engageable with the first retainer 154.

The second end 182 is disposed opposite the first end 180. The second end 182 may be received in the pocket 76 in the housing. The second end 182 may be spaced apart from the closed end of the pocket 76.

The drive gear 184 mates or meshes with the toothed portion 168 of the preload element 150. The drive gear 184 may be positioned along the adjuster element axis 70 between the first end 180 and the second end 182. For example, the drive gear 184 may be positioned in the intermediate portion 74 of the hole 46. The drive gear 184 may have any suitable configuration that is compatible with the toothed portion 168. In the configuration shown, the drive gear 184 is configured as a worm gear or thread that extends around and along the adjuster element axis 70.

The head 186 extends from the first end 180. In at least one configuration, the head 186 may extend further from the adjuster element axis 70 or have a larger diameter than the drive gear 184. As such, the head 186 may act as a stop that may inhibit axial movement or over insertion of the adjuster element 152 into the hole 46. The head 186 may optionally include a tool engagement feature 190 and one or more recesses 192.

The tool engagement feature 190 may extend from the first end 180. The tool engagement feature 190 may have any suitable configuration, such as a male configuration, female configuration, or combinations thereof. In the configuration shown, the tool engagement feature 190 has a female configuration. A tool, such as a driver, wrench, or the like, may mate or engage with the tool engagement feature 190. The tool may apply torque that may adjust or set the bearing preload force as will be discussed in more detail below.

Referring to FIG. 5, one or more recesses 192 may be provided with the head 186. In the configuration shown, the recesses 192 are arranged around the adjuster element axis 70 and may extend toward the adjuster element axis 70. A recess 192 may optionally extend from the first end 180. A retainer such as a second retainer 156 may be received in a recess 192 to limit or inhibit movement of the adjuster element 152 along and/or about the adjuster element axis 70.

Referring to FIGS. 4 and 5, the guide portion 188 may be disposed between the second end 182 and the drive gear 184. For instance, the guide portion 188 may extend from the second end 182 toward or to the drive gear 184. The guide portion 188 may be a bearing surface that supports the adjuster element 152 and facilitates movement of the adjuster element 152. In at least one configuration, the guide portion 188 may have a cylindrical configuration. The guide portion 188 may be disposed closer to the adjuster element axis 70 or have a smaller diameter than the drive gear 184.

The first retainer 154, if provided, is configured to inhibit axial movement of the adjuster element 152. More specifically, the first retainer 154 may inhibit axial movement of the adjuster element 152 along the adjuster element axis 70 when the first retainer 154 is received in the hole 46 and is positioned to contact, engage, or otherwise limit or inhibit movement of the adjuster element 152 along the adjuster element axis 70 in at least one axial direction. The first retainer 154 may be received in the hole 46 in a manner that helps secure or inhibit movement of the first retainer 154 with respect to the housing. For instance, the first retainer 154 may be rotatable about the adjuster element axis 70 and may have a thread that may mate with the threaded portion 72 of the hole 46. The thread may be an external thread that faces away from the adjuster element axis 70. In such a configuration, the first retainer 154 may be screwed into the hole 46 and tightened so that the first retainer 154 engages the first end 180 of the adjuster element 152, thereby inhibiting the adjuster element 152 from moving along the adjuster element axis 70 in an axial direction that extends toward the first retainer 154.

In at least one configuration, the first retainer 154 may include a through hole 200 that may extend along the adjuster element axis 70. The through hole 200 may facilitate insertion of a tool through the first retainer 154 and into engagement with the tool engagement feature 190 of the adjuster element 152, thereby allowing the adjuster element 152 to be actuated and the bearing preload force to be set without removing the first retainer 154 from the hole 46.

The second retainer 156, if provided, is configured to inhibit axial movement of the adjuster element 152. More specifically, the second retainer 156 may inhibit axial movement of the adjuster element 152 along the adjuster element axis 70 when the second retainer 156 is received in the second hole 48 and is positioned to contact, engage, or otherwise limit or inhibit movement of the adjuster element 152 with respect to the adjuster element axis 70. The second retainer 156 may be received in the second hole 48 in a manner that help inhibit movement of the second retainer 156 with respect to the housing. For instance, the second retainer 156 may be rotatable about a second retainer axis 210 and may have a thread 212 that may mate with the threaded portion 78 of the second hole 48. In such a configuration, the second retainer 156 may be screwed into the second hole 48 and tightened so that the second retainer 156 is received in a recess 192 in the head 186, thereby inhibiting the adjuster element 152 from rotating about the adjuster element axis 70 and/or moving along the adjuster element axis 70. The second retainer axis 210 may differ from the axis 50 and the adjuster element axis 70. For instance, the second retainer axis 210 may be disposed substantially perpendicular to the adjuster element axis 70. It is contemplated that the second retainer axis 210 may intersect the adjuster element axis 70 and may not intersect the axis 50.

An example of steps associated with setting the bearing preload force with the preload mechanism 30 will now be described. The steps will be described in the context of an assembled differential carrier 42 as shown in FIGS. 3 and 4.

First, the first retainer 154 and second retainer 156, if provided, may be either loosened or removed if either or both of these retainers impedes movement of the adjuster element 152 in a desired direction. It is contemplated that the first retainer 154 may not be loosened but instead may hold the adjuster element 152 in a manner that limits or inhibits movement of the adjuster element 152 along the adjuster element axis 70 while the second retainer 156 may be loosened to permit the adjuster element 152 to rotate about the adjuster element axis 70.

Next, the adjuster element 152 is actuated. Force is exerted on the adjuster element to actuate the adjuster element 152. The force that is exerted on the adjuster element 152 may be torque that is applied by a tool. The tool may be inserted into the hole 46 and optionally through the through hole 200 in the first retainer 154. The tool may be inserted to mate or engage with the tool engagement feature 190.

Rotation of the adjuster element 152 about the adjuster element axis 70 may transmit force to at least the first bearing assembly 28 to adjust or set the bearing preload force. Torque that is applied to the adjuster element 152 may rotate the adjuster element 152 about the adjuster element axis 70 and modify the preload force exerted by the preload element 150 due to the interaction of the drive gear 184 of the adjuster element 152 and the toothed portion 168 of the preload element 150. Rotation of the adjuster element 152 about the adjuster element axis 70 or the application of torque in a first rotational direction may transmit torque to the preload element 150 in a manner that increases the bearing preload force exerted by the preload element 150 against the bearing assembly 28. Rotation of the adjuster element 152 about the adjuster element axis 70 in the opposite direction or the application of torque in a second rotational direction that is opposite the first rotational direction may transmit torque to the preload element 150 in a manner that decreases the bearing preload force exerted by the preload element 150 against the bearing assembly 28. The adjuster element 152 can be tightened or loosened independently from tightening or loosening the first retainer 154.

Once a desired amount of bearing preload force is applied, the adjuster element 152 may be secured to limit or inhibit further movement of the preload element 150, such as by tightening the first retainer 154, the second retainer 156, or both. The tool may be removed either before or after tightening the first retainer 154 in a configuration in which the tool is inserted through the first retainer 154.

Figure 6:
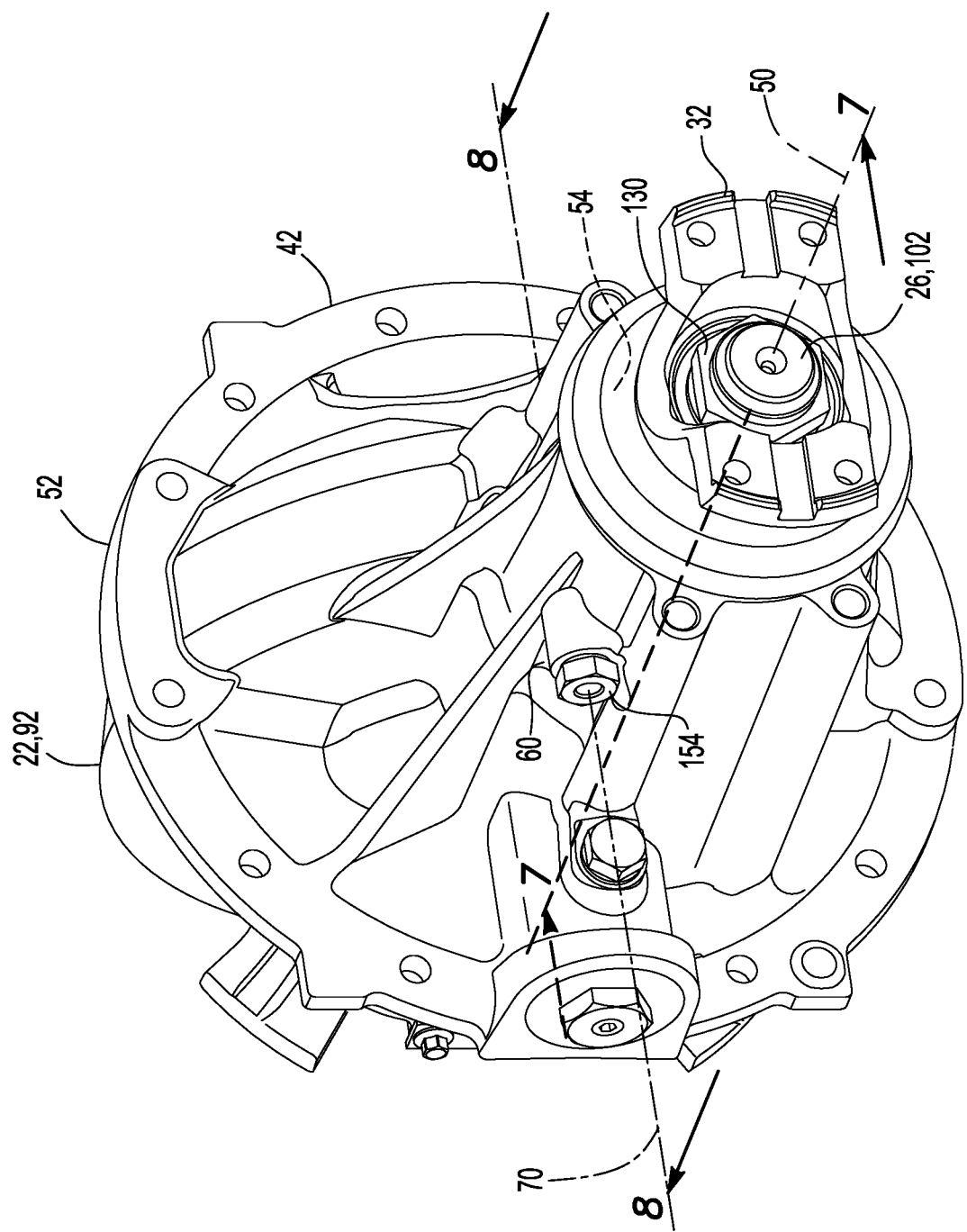
FIG. 6 is a perspective view of a housing of the axle assembly that is configured as a differential carrier.
Figure 7:
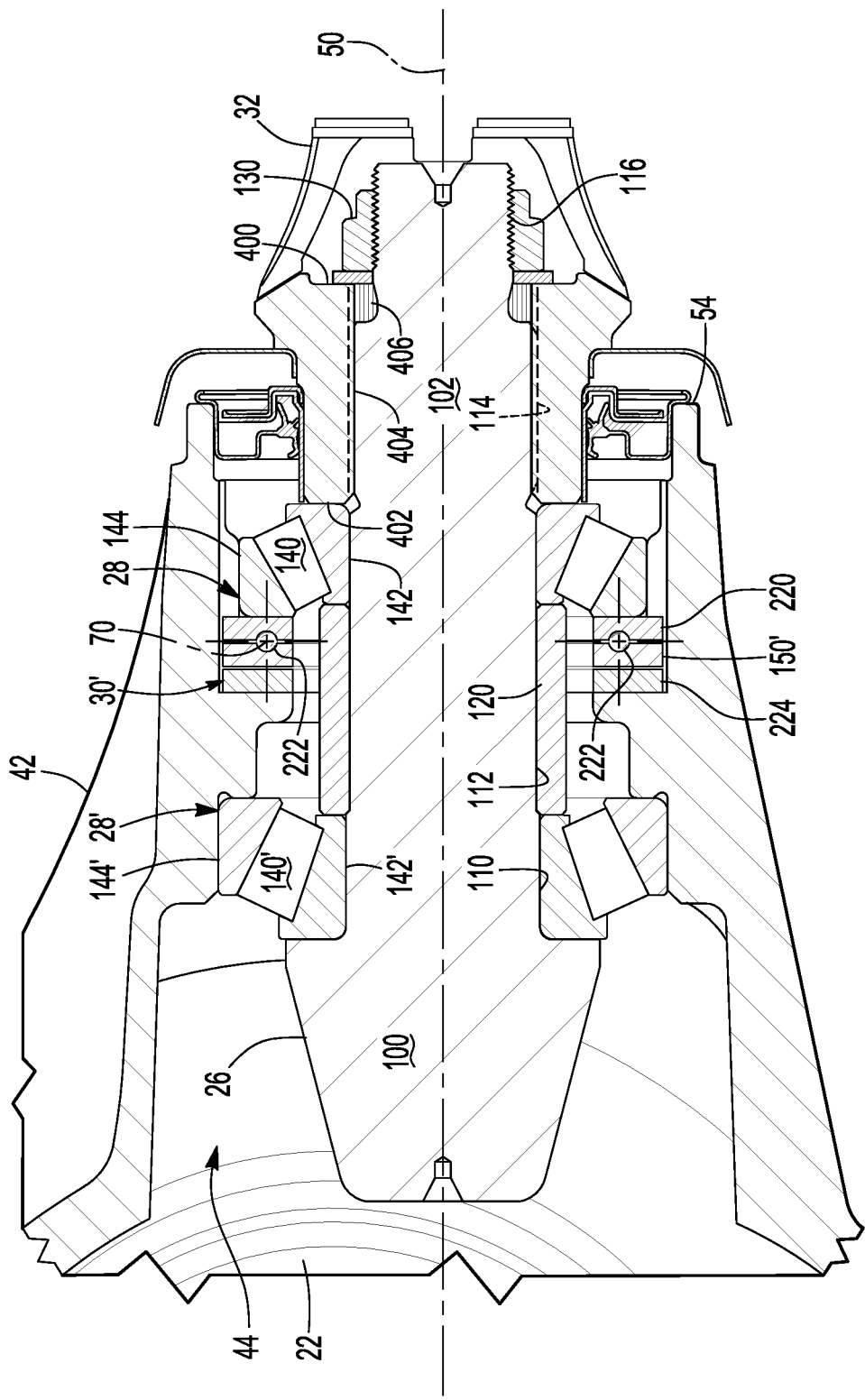
FIG. 7 is a section view along section line 7-7.
Figure 8:
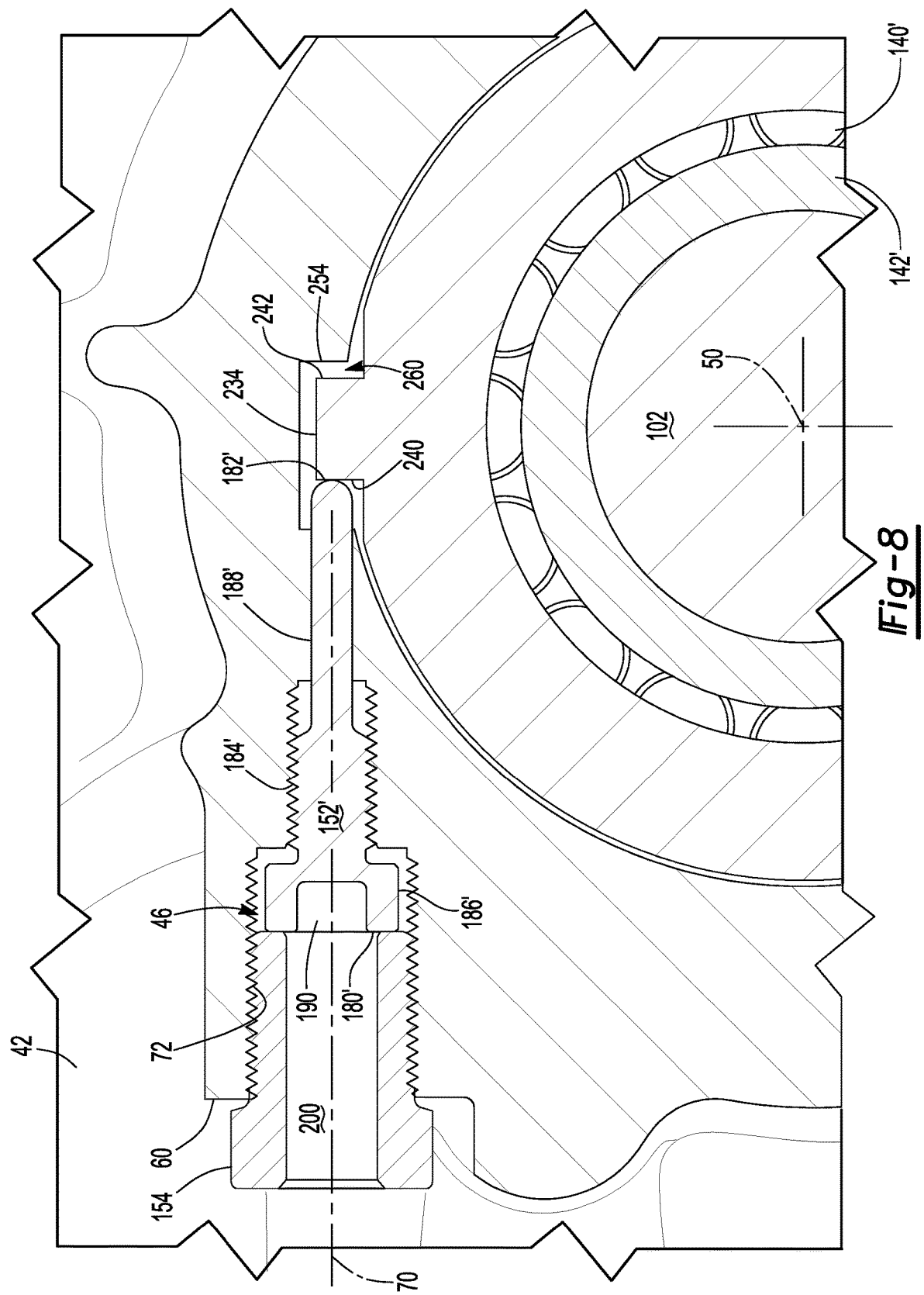
FIG. 8 is a section view along section line 8-8 showing a second example of a preload mechanism.

Referring to FIGS. 6-13, another configuration of a preload mechanism 30' shown. In this configuration, the preload element and the adjuster element are designated with reference numbers 150' and 152', respectively. For simplicity, only a first retainer 154 is shown in FIGS. 6 and 8; however, it is to be understood that a second retainer 156 could be provided in addition to the first retainer 154 or instead of the first retainer 154. In this configuration, the preload mechanism 30' also includes a first race 220, at least one rotatable bearing element 222, and optionally a second race 224.

Figure 11:
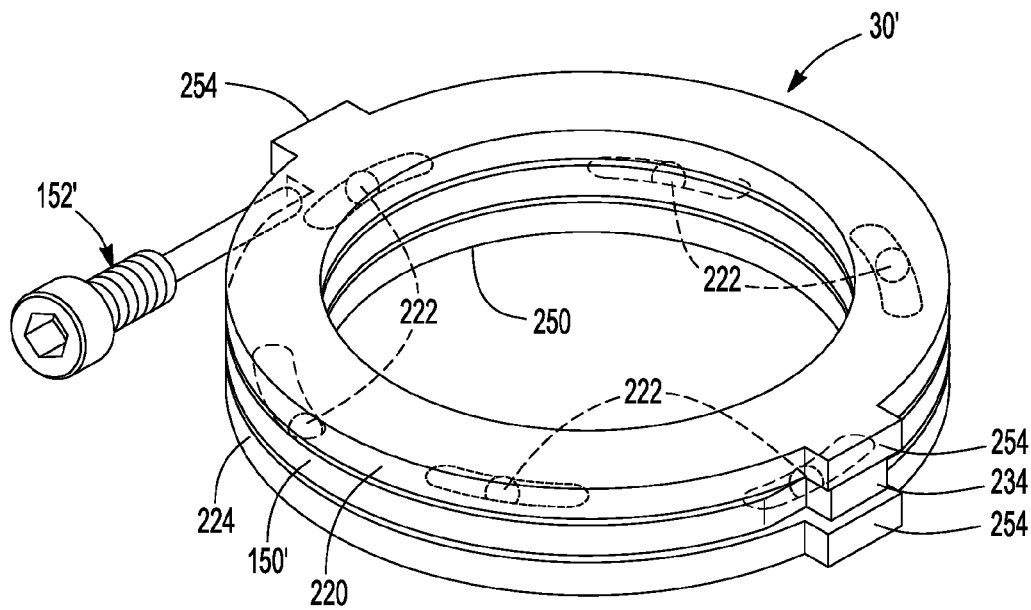
FIG. 11 is a perspective view of the preload mechanism of FIG. 8.

Referring primarily to FIGS. 7 and 11, the preload element 150' is disposed inside the housing, such as completely disposed in the cavity 44 of the differential carrier 42. The preload element 150' may be positioned along the axis 50 between the first bearing assembly 28 and the second bearing assembly 28'. The preload element 150' is rotatable about the axis 50. The preload element 150' may encircle the axis 50, the shaft 102, the spacer 120, or combinations thereof. The preload element 150' may be spaced apart from the first race 220 and the second race 224. The preload element 150' may include a first side 230, a second side 232, one or more tabs 234.

Figure 9:
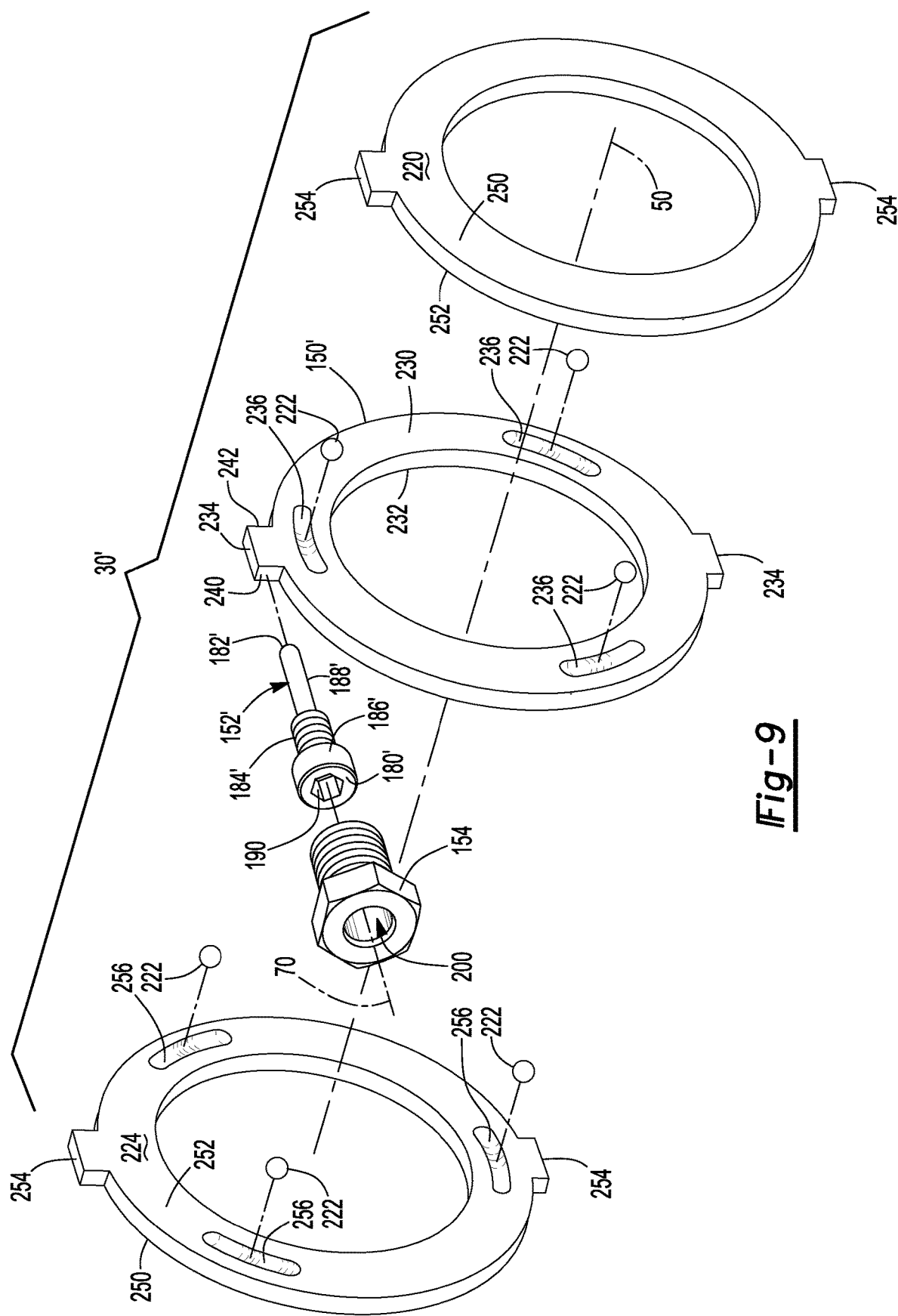
FIGS. 9 and 10 are exploded views of the preload mechanism shown in FIG. 8.

Referring primarily to FIGS. 7 and 9-12, the first side 230 faces toward the first bearing assembly 28 and the first race 220. In addition, the first side 230 may be spaced apart from the first race 220 such that a gap is provided between the first side 230 and the first race 220. In at least one configuration, the first side 230 may be disposed substantially perpendicular to the axis 50. As is best shown in FIG. 9, one or more grooves 236 may extend from the first side 230. A groove 236 may extend along an arc. In addition, a groove 236 may be disposed at a constant or substantially constant radial distance from the axis 50. A groove 236 may not encircle the axis 50. A groove 236 be discontinuous or spaced apart from any other grooves 236 that extend from the first side 230. One or more rotatable bearing elements 222 may be partially received in a groove 236.

Figure 10:
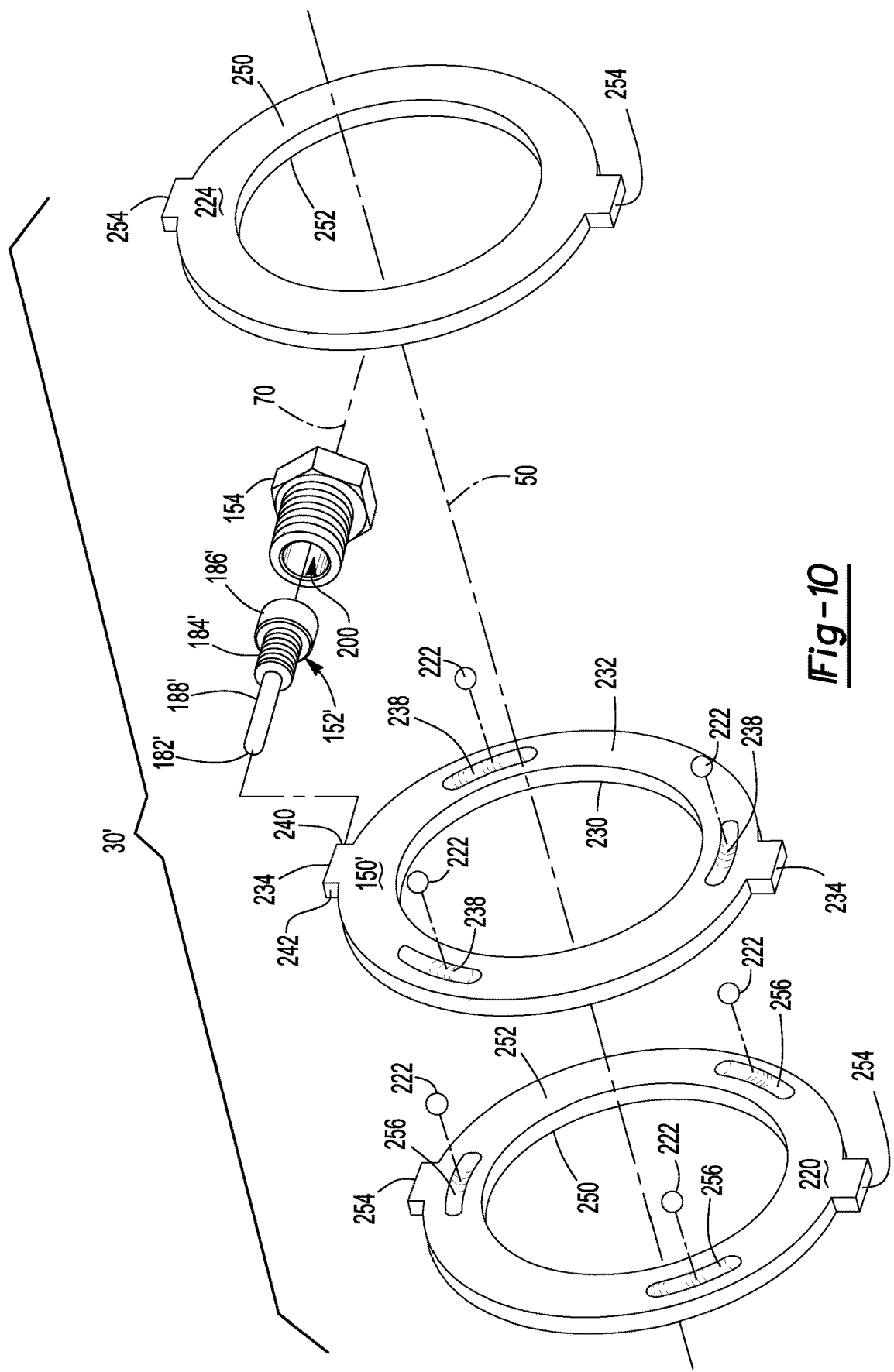

The second side 232 is disposed opposite the first side 230. As such, the second side 232 may face toward the second race 224, if provided. In addition, the second side 232 may be spaced apart from the second race 224 such that a gap is provided between the second side 232 and the second race 224. As is best shown in FIG. 10, one or more grooves 238 may extend from the second side 232. A groove 238 may extend along an arc. In addition, a groove 238 may be disposed at a constant or substantially constant radial distance from the axis 50. A groove 238 that is provided in the second side 232 may be offset from a groove 236 that is provided in the first side 230. As such a groove 238 in the second side 232 may not be disposed directly opposite or overlap a groove 236 that is provided in the first side 230. A groove 238 may not encircle the axis 50. A groove 238 may be discontinuous or spaced apart from any other grooves 238 that extend from the second side 232. One or more rotatable bearing elements 222 may be partially received in a groove 238.

Referring to FIGS. 8 and 9, one or more tabs 234 may be provided with the preload element 150'. A tab 234 facilitates engagement with the adjuster element 152'. A tab 234 may include a surface that extends away from the axis 50. In the configuration shown, the tab 234 includes a first surface 240 and a second surface 242; however, it is contemplated that the second surface 242 may be omitted in various configurations. The first surface 240 may face toward and may engage the adjuster element 152'. The second surface 242 may be disposed opposite the first surface 240.

Referring to FIGS. 7, 9, and 10, the first race 220 is disposed inside the cavity 44 of the housing and is positioned along the axis 50 between the preload element 150' and a bearing assembly. The first race 220 may engage a race of a bearing assembly. For example, the first race 220 may engage or contact the outer race 144 of the first bearing assembly 28. In addition, the first race 220 may be spaced apart from the preload element 150'. In at least one configuration, the first race 220 may include a first side 250, a second side 252, and one or more tabs 254.

The first side 250 faces toward the first bearing assembly 28. For instance, the first side 250 may engage or contact the outer race 144 of the first bearing assembly 28.

The second side 252 is disposed opposite the first side 250. As such, the second side 252 may face toward the first side 230 of the preload element 150'. The second side 252 of the first race 220 may be spaced apart from and may not contact the first side 230 of the preload element 150'. As is best shown in FIG. 10, one or more grooves 256 may extend from the second side 252. A groove 256 may extend along an arc. In addition a groove 256 may be disposed at a constant or substantially constant radial distance from the axis 50. A groove 256 may not encircle the axis 50. A groove 256 may be discontinuous or spaced apart from any other grooves 256 that extend from the second side 252. One or more rotatable bearing elements 222 may be partially received in a groove 256. A rotatable bearing element 222 that is received in a groove 256 in the first race 220 may also be received in a groove 236 in the first side 230 of the preload element 150'.

Referring primarily to FIGS. 8-10, one or more tabs 254 may be provided with the first race 220. A tab 254 may extend away from the axis 50 and may protrude from an outer side of the first race 220 that faces away from the axis 50. Unlike the tab 234 of the preload element 150', a tab 254 does not facilitate engagement with the adjuster element 152'. Instead, the tab 254 is configured to engage the housing to inhibit or limit rotation of the first race 220 about the axis 50. For example, a tab 254 may be received in a notch 260 of the housing, which is best shown in FIG. 8. The notch 260 may be configured as a groove or recess that may extend away from the axis 50. The tab 254 and the housing may cooperate to inhibit or limit rotation of the first race 220 about the axis 50 in at least one rotational direction when the tab 254 engages the housing in the notch 260. For instance, a side of the tab 254 that faces away from the adjuster element 152' may engage or contact a side of the notch 260 that faces toward the tab 254 to limit or inhibit rotation of the first race 220 in a clockwise direction about the axis 50 from the perspective shown in FIG. 8. Conversely, an opposite side of the tab 254 may engage or contact an opposing side of the notch 260 to limit or inhibit rotation of the first race 220 in a counterclockwise direction about the axis 50 from the perspective shown in FIG. 8. The tab 254 may have a different configuration as compared to the tab 234 of the preload element 150'. For instance the tab 234 may be smaller than the tab 254.

One or more rotatable bearing elements 222 may facilitate rotation of the preload element 150' with respect to the first race 220. A rotatable bearing element 222 may have any suitable configuration. In the configuration shown, the rotatable bearing elements 222 are illustrated as ball bearings; however, any shape or configuration that is compatible with a groove may be provided. The rotatable bearing elements 222 may be sized to separate the preload element 150' from the first race 220 to facilitate rotation of the preload element 150'.

Referring to FIGS. 7, 9, and 10, the second race 224, if provided, may have a similar or identical configuration as the first race 220. However, the second race 224 may face in the opposite direction and may be disposed on an opposite side of the preload element 150' from the first race 220. As such, the preload element 150' may be axially positioned between the first race 220 and the second race 224. The second race 224 may be disposed inside the cavity 44 of the housing. The second race 224 may be positioned along the axis 50 between the preload element 150' and the housing, such as a wall or portion of the housing that is disposed in the cavity 44 and extends toward the axis 50. As such, the second race 224 may engage the housing. The second race 224 may be spaced apart from the preload element 150'. In at least one configuration, the second race 224 may include a first side 250, a second side 252, and one or more tabs 254.

The first side 250 of the second race 224 faces away from the preload element 150'. The first side 250 may engage or contact the housing.

The second side 252 of the second race 224 may be disposed opposite the first side 250 of the second race 224. The second side 252 of the second race 224 may face toward the second side 232 of the preload element 150'. The second side 252 may be spaced apart from the first side 230. One or more grooves 256 may be provided in the second side 252 as previously discussed. A rotatable bearing element 222 that is received in a groove 256 in the second side 252 of the second race 224 may also be received in a groove 238 in the second side 232 of the preload element 150'. The rotatable bearing element 222 may be sized such that the preload element 150' is separated from the second race 224 to facilitate rotation of the preload element 150' about the axis 50.

Referring primarily to FIGS. 8-10, one or more tabs 254 may be provided with the second race 224. The tab 254 may have the same structure and function as the tab 254 of the first race 220 as previously described.

Referring primarily to FIGS. 8 and 9, the adjuster element 152' engages the preload element 150' and is configured to actuate the preload element 150' to exert a preload force on at least one bearing assembly 28, 28'. The adjuster element 152' is moveable along the adjuster element axis 70. For instance, the adjuster element 152' may move or translate along the adjuster element axis 70, which in turn exerts force on the preload element 150' and may actuate the preload element 150'. The adjuster element 152' is disposed in the hole 46 in the housing. In addition, the adjuster element 152' is accessible from outside of the housing. More specifically, the adjuster element 152' is accessible from outside of the housing and is actuatable from outside of the housing when the drive pinion 26 and the bearing assembly 28, 28' are disposed in the cavity 44 and mounted to the housing with the preload element 150' positioned along the axis 50 therebetween such as is shown in FIG. 7. Moreover, the adjuster element 152' may be actuatable when the yoke 32 is installed on the shaft 102 and secured with the nut 130. In the configuration shown, the adjuster element 152' may include a first end 180', a second end 182', a threaded portion 184', a head 186', a guide portion 188', or combinations thereof.

The first end 180' may be disposed in the hole 46 or may optionally be disposed outside of the hole 46 and the housing. The first end 180' is engageable with the first retainer 154.

The second end 182' is disposed opposite the first end 180'. The second end 182' is engageable with the preload element 150'. For instance, the second end 182' may be engageable with the tab 234 of the preload element 150'.

The threaded portion 184' is positioned along the adjuster element axis 70 between the first end 180' and the second end 182'. For example, the threaded portion 184' may extend between the head 186' in the guide portion 188'. The threaded portion 184' may mate with a corresponding thread that is provided in the hole 46.

The head 186' extends from the first end 180'. In at least one configuration, the head 186' may extend further from the adjuster element axis 70 or have a larger diameter than the threaded portion 184'. As such, the head 186' may act as a stop that may inhibit axial movement or over insertion of the adjuster element 152' into the hole 46. The head 186' may optionally include a tool engagement feature 190 as previously described. The head 186' may optionally include one or more recesses 192 as previously described.

The guide portion 188' may be disposed between the second end 182' and the threaded portion 184'. The guide portion 188' may be a bearing surface that supports the adjuster element 152' and facilitates movement of the adjuster element 152' along and/or about the adjuster element axis 70. In at least one configuration, the guide portion 188' may have a cylindrical configuration. The guide portion 188' may be disposed closer to the adjuster element axis 70 or have a smaller diameter than the threaded portion 184'.

An example of steps associated with setting the bearing preload force with the preload mechanism 30' will now be described. The steps will be described in the context of an assembled differential carrier 42 as shown in FIGS. 6 and 7.

First, the first retainer 154 and second retainer 156, if provided, may be either loosened or removed if either or both of these retainers impedes movement of the adjuster element 152' in a desired direction. It is contemplated that the first retainer 154 may not be loosened when the adjuster element 152' is to be tightened or actuated along the adjuster element axis 70 away from the first retainer 154.

Next, the adjuster element 152' is moved along the axis 50. The adjuster element 152' may be moved along the axis by exerting force on the adjuster element 152'. The force that is exerted on the adjuster element 152' may be torque that is applied by a tool. The tool may be inserted into the hole 46 and optionally through the through hole 200 in the first retainer 154. The tool may be inserted to mate or engage with the tool engagement feature 190.

Figure 12:
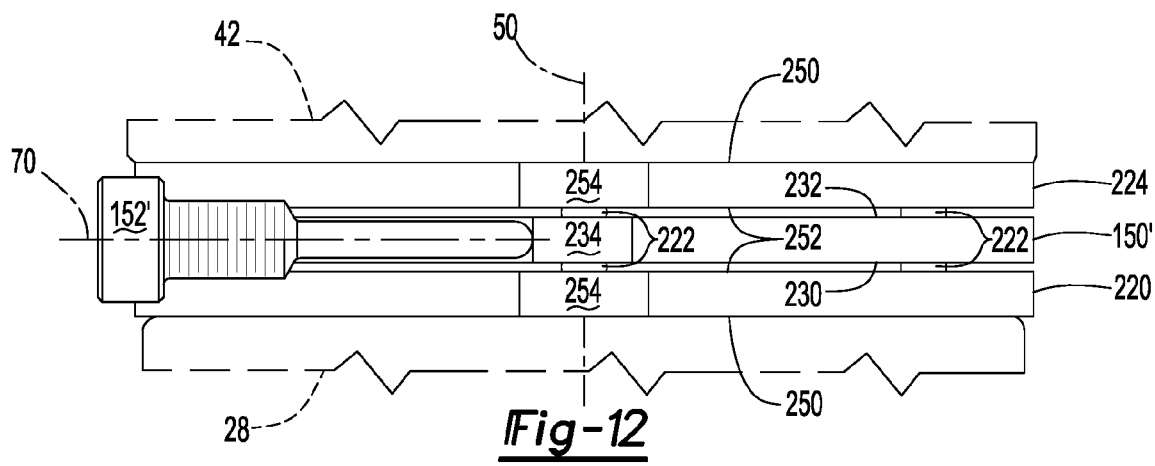
FIG. 12 is a side view of the preload mechanism of FIG. 8 in a first position.
Figure 13:
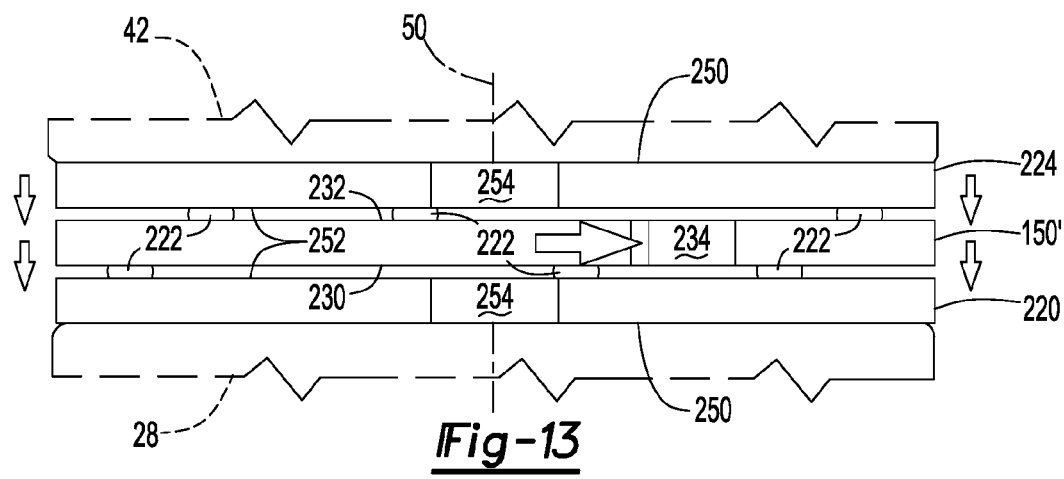
FIG. 13 is a side view of the preload mechanism of FIG. 8 in an example of a second position.

Torque that is applied by the tool to the adjuster element 152' may rotate the adjuster element 152' about the adjuster element axis 70 due to the interaction of the second end 182' of the adjuster element 152' and the tab 234 of the preload element 150'. Rotation of the adjuster element 152' about the adjuster element axis 70 may transmit force to at least the first bearing assembly 28 to adjust or set the bearing preload force. This is illustrated in a somewhat exaggerated manner in FIGS. 12 and 13. In FIGS. 12 and 13 the preload mechanism 30' is shown without various components for clarity.

In FIG. 12, the preload mechanism 30' is shown in the same rotational position as is shown in FIG. 8 and with the preload element 150' in an initial position or first position. Tightening the adjuster element 152' causes the preload element 150' to rotate in a clockwise direction about the axis 50 from the perspective shown in FIG. 8 to a second position. An example of the preload element 150' shown in a second position is shown in FIG. 13.

In FIG. 13, the preload element 150' has been rotated by a sufficient distance such that at least some of the rotatable bearing elements 222 reach the end of a corresponding groove, such as a groove 236, 238 of the preload element 150', a groove 256 in the first race 220, a groove 256 in the second race 224, or combinations thereof. A rotatable bearing element 222 may rotate freely in a corresponding groove or grooves prior to reaching the end of a groove. As a result, the gap between the preload element 150' and the first race 220 and the gap between the preload element 150' and the second race 224 may remain unchanged or substantially constant before a rotatable bearing element 222 reaches the end of one or more grooves in which it is received (i.e., the gap may remain as shown in FIG. 12 prior to a rotatable bearing element 222 reaching the end of a corresponding groove or grooves in which it is received. Once one or more rotatable bearing elements 222 reach the end of one or more grooves in which the rotatable bearing element or rotatable bearing elements 222 are received, then the gap between the preload element 150' and a corresponding race increases as the rotatable bearing element 222 begins to rotate up the closed end of a corresponding groove, which is represented by the vertical arrowed lines in FIG. 13 and the increased gap or distance between the preload element 150' and the first race 220 and the increased gap or distance between the preload element 150' and the second race 224 shown in FIG. 13 as compared to FIG. 12.

Rotation of the adjuster element 152' about the adjuster element axis 70 or the application of torque in a first rotational direction may transmit torque to the preload element 150' in a manner that increases the bearing preload force exerted by the preload element 150' against the bearing assembly 28. Rotation of the adjuster element 152' about the adjuster element axis 70 in the opposite direction or the application of torque in a second rotational direction that is opposite the first rotational direction may decrease the bearing preload force exerted by the preload element 150' against the bearing assembly 28. The adjuster element 152' can be tightened or loosened independently from tightening or loosening the first retainer 154 and the second retainer 156.

Once a desired amount of bearing preload force is applied, the adjuster element 152' may be secured to limit or inhibit further movement of the preload element 150', such as by tightening the first retainer 154, the second retainer 156, or both. The tool may be removed either before or after tightening the first retainer 154 in a configuration in which the tool is inserted through the first retainer 154.

Figure 14:
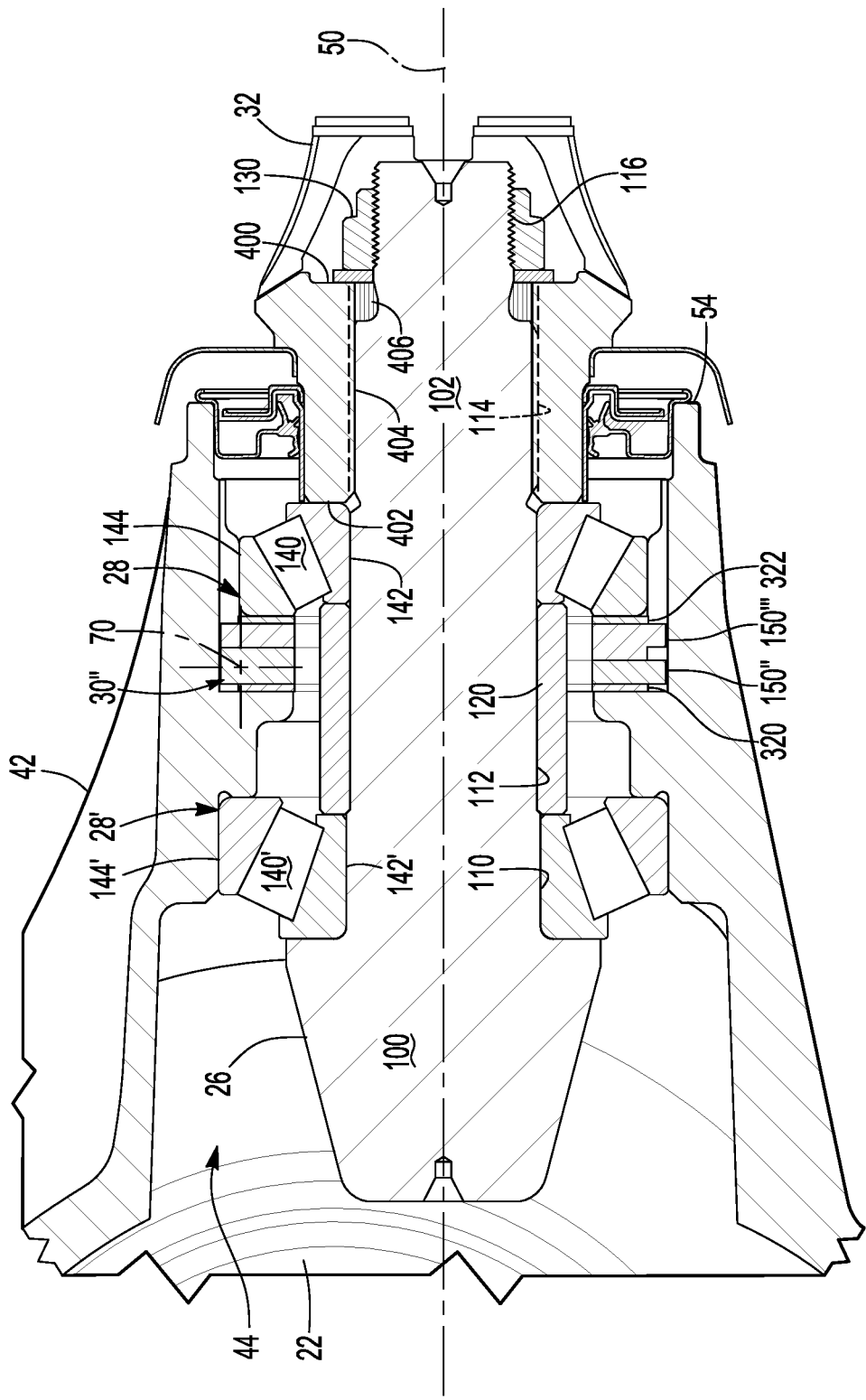
FIG. 14 is a section view along section line 7-7 showing another example of a preload mechanism.
Figure 15:
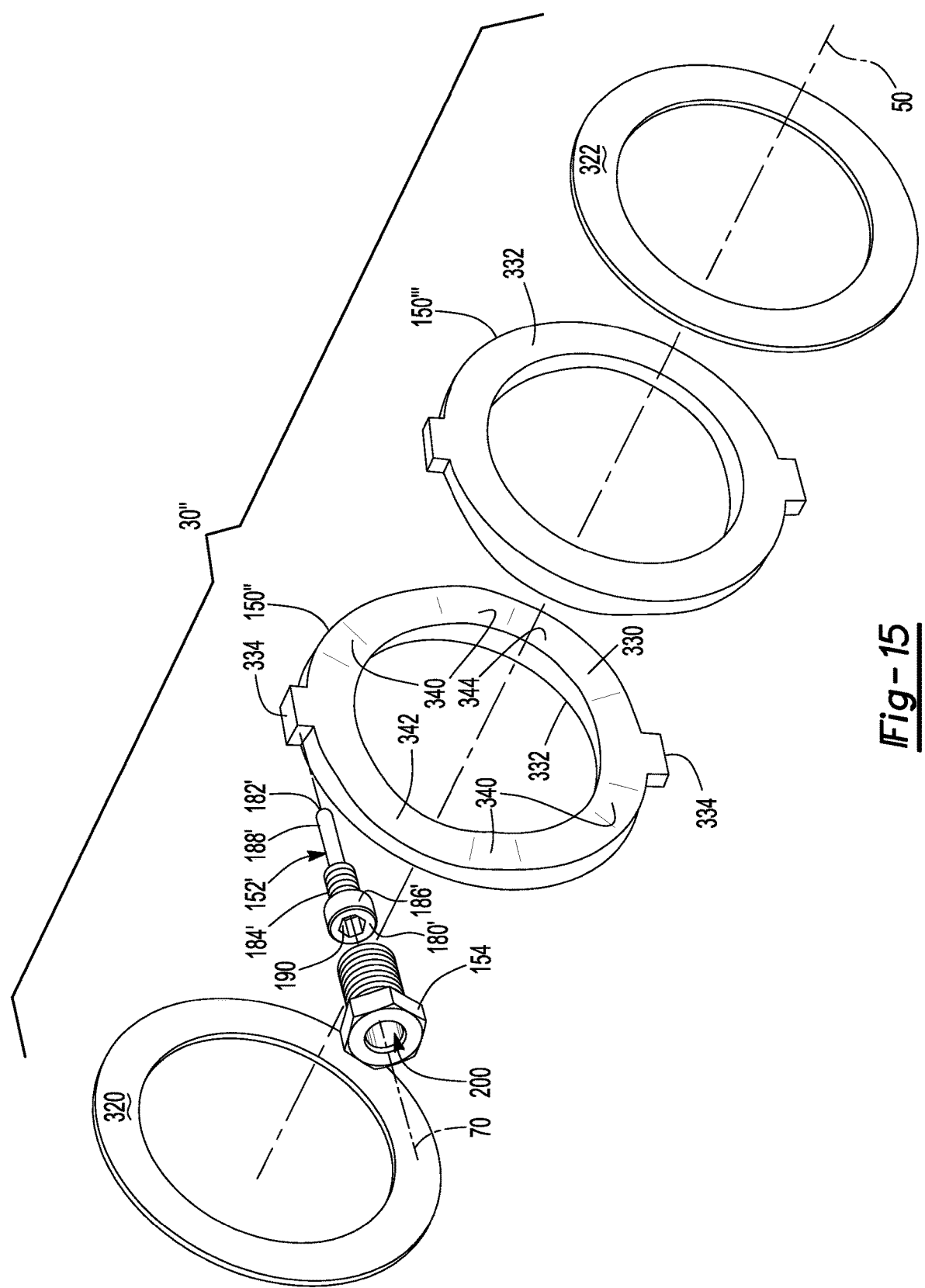
FIG. 15 is an exploded view of the preload mechanism shown in FIG. 14.

Referring to FIGS. 14-18, another configuration of a preload mechanism 30" is shown. Externally, this configuration may appear to be the same as is shown in FIG. 6. In this configuration, the preload element is designated with reference number 150". The adjuster element 152' may be the same as that previously described. For simplicity, only a first retainer 154 is shown in FIG. 15; however, it is to be understood that a second retainer 156 could be provided in addition to the first retainer 154 or instead of the first retainer 154. In this configuration, the preload mechanism 30" also includes a second preload element 150''' and may optionally include a first washer 320, a second washer 322, or both.

The preload element 150" is disposed inside the housing, such as completely disposed in the cavity 44 of the differential carrier 42. The preload element 150" may be positioned along the axis 50 between the first bearing assembly 28 and the second bearing assembly 28'. In addition, the preload element 150" may be spaced apart from the first bearing assembly 28 and the second bearing assembly 28'. The preload element 150" is rotatable about the axis 50. The preload element 150" may encircle the axis 50, the shaft 102, the spacer 120, or combinations thereof. The preload element 150" may engage or contact the second preload element 150'''. The preload element 150" may include a first side 330, a second side 332, one or more tabs 334.

The first side 330 may face toward the first bearing assembly 28 and the second preload element 150'''. In addition, the first side 330 may engage or contact the second preload element 150'''. The first side 330 may have a nonplanar configuration. In addition, the first side 330 includes one or more preload element ramps 340.

Figure 17:
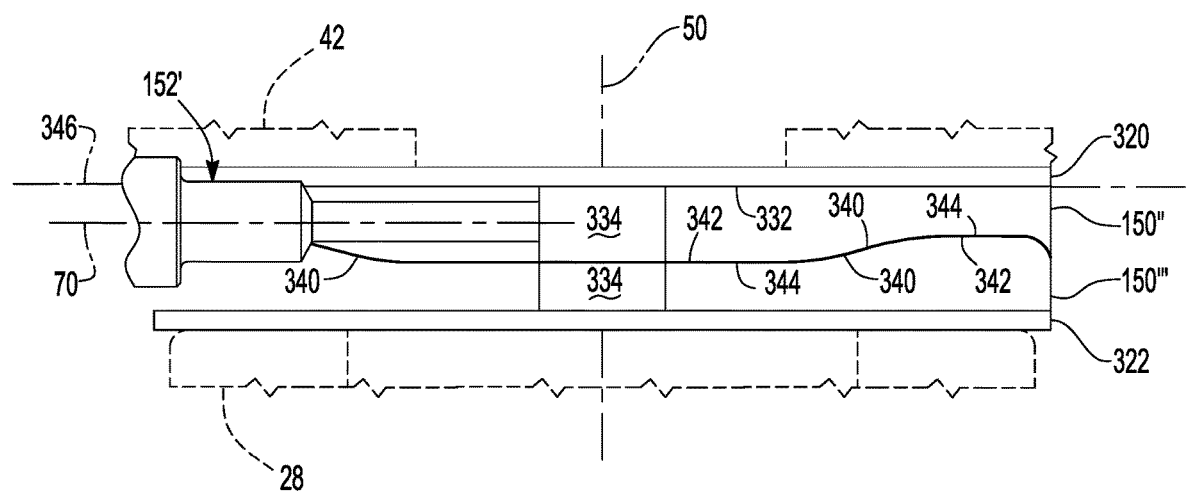
FIG. 17 a side view of the preload mechanism of FIG. 14 in a first position.

A preload element ramp 340 may extend partially around the axis 50. As such, the preload element ramp 340 may extend along an arc. As is best shown in FIG. 17, a preload element ramp 340 may extend from a first flat 342 to a second flat 344. A preload element ramp 340 may be disposed in a nonparallel relationship with respect to the second side 332, the first flat 342, the second flat 344, or combinations thereof. In addition, a preload element ramp 340 may be disposed in a nonparallel relationship with respect to a plane 346 that may that intersect the axis 50 and may be disposed substantially perpendicular to the axis 50.

The first flat 342 of the preload element 150" may be disposed closer to the second side 332 than the second flat 344 is disposed to the second side 332. In at least one configuration, the first flat 342 may be a generally planar surface that may be disposed substantially perpendicular to the axis 50. In a configuration having multiple preload element ramps 340, the first flat 342 may extend from an end of one preload element ramp 340 to an end of another preload element ramp 340.

The second flat 344 may be spaced apart from the first flat 342. The second flat 344 may be disposed further from the second side 332 than the first flat 342 is disposed from the second side 332. In at least one configuration, the second flat 344 may be a generally planar surface that may be disposed substantially perpendicular to the axis 50. In a configuration having multiple preload element ramps 340, the second flat 344 may extend from a second end of one preload element ramp 340 to the second end of another preload element ramp 340.

The second side 332 may be disposed opposite the first side 330. The second side 332 may engage or contact the first washer 320 if provided. Alternatively, the second side 332 may contact the housing, such as a wall or portion of the housing that is disposed in the cavity 44 and extends toward the axis 50, when the first washer 320 is omitted. In at least one configuration, the second side 332 may be planar or substantially planar. For instance, the second side 332 may be disposed substantially perpendicular to the axis 50.

Figure 16:
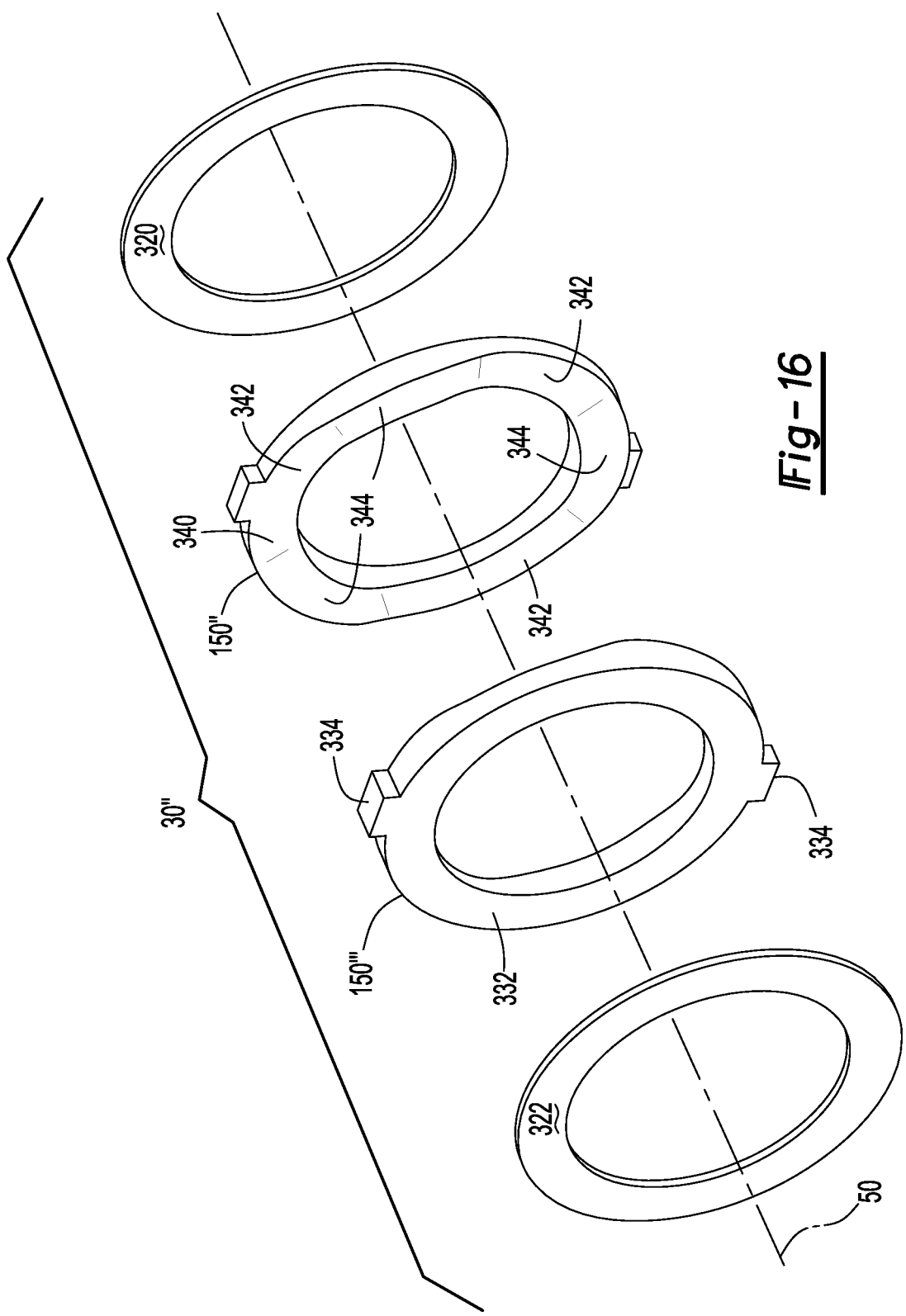
FIG. 16 is a reverse exploded view of the preload mechanism shown in FIG. 14 with some components omitted for clarity.

Referring primarily to FIGS. 15-17, one or more tabs 334 may be provided with the preload element 150". A tab 334 facilitates engagement with the adjuster element 152' and may have the same configuration as the tab 234 previously described.

The second preload element 150''' may have the same configuration as the preload element 150". However, the second preload element 150''' may face in the opposite direction from the preload element 150". For instance, the second preload element 150''' may be axially positioned between the preload element 150" and the bearing assembly 28. As such, the first flat 342 of the preload element 150" may be engageable with the first flat 342 of the second preload element 150''', the second flat 344 of the preload element 150" may be engageable with the second flat 344 of the second preload element 150''', and the preload element ramp 340 of the preload element 150" may be engageable with a preload element ramp 340 of the second preload element 150''' depending on the rotational position of the preload element 150". A tab 334 of the second preload element 150''' is receivable in a notch 260 of the housing to inhibit rotation of the second preload element 150''' in the same manner as the tab 254 of the first race 220 previously described. The tab 334 of the second preload element 150''' may be spaced apart from and may not be engageable with the adjuster element 152'.

The first washer 320, if provided, may extend between the housing and the preload element 150". For instance, the first washer 320 may extend from the second side 332 of the preload element 150" to the housing.

The second washer 322, if provided, may extend between the bearing assembly 28 and the second preload element 150'''. For instance, the second washer 322 may extend from the outer race 144 of the first bearing assembly 28 to the second side 332 of the second preload element 150'''.

An example of steps associate with setting the bearing preload force with the preload mechanism 30" will now be described. The steps will be described in the context of an assembled differential carrier 42 as shown in FIG. 14.

First, the first retainer 154 and second retainer 156, if provided, may be either loosened or removed if either or both of these retainers impedes movement of the adjuster element 152' in a desired direction.

Figure 18:
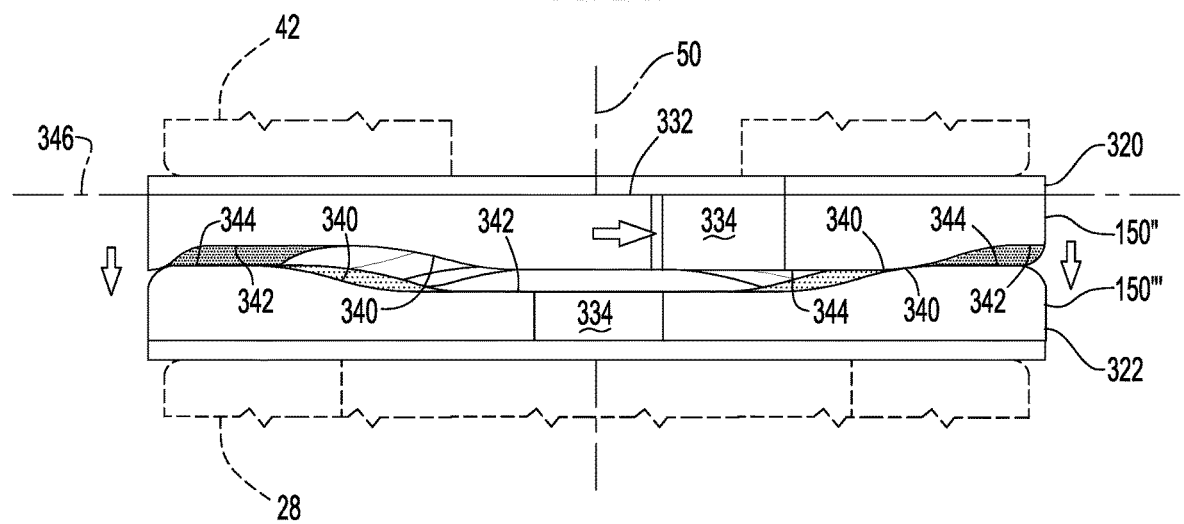
FIG. 18 is a side view of the preload mechanism of FIG. 14 in an example of a second position.

Next, the adjuster element 152' is moved along the axis 50 in the same manner as previously discussed with respect to the preload mechanism 30'. Torque that is applied by the tool to the adjuster element 152' may rotate the adjuster element 152' about the adjuster element axis 70 due to the interaction of the second end 182' of the adjuster element 152' and the tab 234 of the preload element 150'. Rotation of the adjuster element 152' about the adjuster element axis 70 may transmit force to at least the first bearing assembly 28 to adjust or set the bearing preload force. This is illustrated in a somewhat exaggerated manner in FIGS. 17 and 18. In FIGS. 17 and 18 the preload mechanism 30" is shown without various components for clarity.

In FIG. 17, the preload mechanism 30" is shown in an initial position or first position that may be analogous to the rotational position of the preload element 150' shown in FIG. 8. In this position, the tabs 334 of the preload element 150" and the second preload element 150''' may be aligned or substantially aligned. The first flat 342 of the preload element 150" engages or contacts contact the first flat 342 of the second preload element 150'''. Optionally, the second flat 344 of the preload element 150" may engage or contact the second flat 344 of the second preload element 150''', the preload element ramp 340 of the preload element 150" may be engageable with a preload element ramp 340 of the second preload element 150''', or both. It is contemplated that a gap may be provided between the preload element ramp 340 of the preload element 150" and an adjacent preload element ramp 340 of the second preload element 150''' in this position.

Tightening the adjuster element 152' causes the preload element 150" to rotate about the axis 50 to a second position. An example of a second position is shown in FIG. 18.

In FIG. 18, the preload element 150" has been rotated by a sufficient distance such that a preload element ramp 340 of the preload element 150" engages and slides along an adjacent preload element ramp 340 of the second preload element 150'''. As a result, the preload element 150" moves the second preload element 150''' toward the bearing assembly 28, which is represented by the vertical arrowed lines in FIG. 18 and the increased gap or distance between the preload element 150" and the second preload element 150''' as compared to FIG. 17. The second preload element 150''' may not rotate or may have limited rotation due to the interaction between the tab 334 of the second preload element 150''' and the notch of the housing. The first flat 342 of the preload element 150" disengages the first flat 342 of the second preload element 150''' such that a gap may be provided therebetween. Similarly, the second flat 344 of the preload element 150" may disengage or move further away from the second flat 344 of the second preload element 150'''.

Rotation of the adjuster element 152' about the adjuster element axis 70 or the application of torque in a first rotational direction may transmit torque to the preload element 150" in a manner that increases the bearing preload force exerted by the preload element 150" against the bearing assembly 28. Rotation of the adjuster element 152' about the adjuster element axis 70 in the opposite direction or the application of torque in a second rotational direction that is opposite the first rotational direction may transmit torque to the preload element 150" in a manner that decreases the bearing preload force exerted by the preload element 150" against the bearing assembly 28. The adjuster element 152' can be tightened or loosened independently from tightening or loosening the first retainer 154 and the second retainer 156.

Once a desired amount of bearing preload force is applied, the adjuster element 152' may be secured to limit or inhibit further movement of the preload element 150', such as by tightening the first retainer 154, the second retainer 156, or both as previously discussed.

Referring to FIGS. 1-3, the yoke 32, if provided, is configured to facilitate coupling of the drive pinion 26 to the power source or to another axle assembly. For instance, the yoke 32 may be coupled to another component, such as a universal joint, which in turn may be coupled to a torque transmitting component like a drive shaft or a prop shaft. The yoke 32 may be stationarily mounted to the drive pinion 26. In at least one configuration, the yoke 32 may include a first yoke end surface 400, a second yoke end surface 402, a yoke hole 404, a yoke spline 406, or combinations thereof. The yoke 32 does not inhibit rotation or loosening of the nut 130. The yoke may be omitted in an axle assembly that includes an electric motor as compared to a configuration in which the power source or electric motor is remotely positioned from the axle assembly.

Referring primarily to FIG. 3, the first yoke end surface 400 faces away from the gear 100 when the yoke 32 is installed on the drive pinion 26. A fastener, such as a nut 130 or nut and washer, may be provided to inhibit axial movement of the yoke 32 or movement along the axis 50 with respect to the shaft 102 of the drive pinion 26. For instance, the nut 130 may be threaded onto the threaded portion 116 of the shaft 102 and the nut 130 or washer may engage the first yoke end surface 400.

The second yoke end surface 402 may be disposed opposite the first yoke end surface 400. The second yoke end surface 402 may face toward the gear 100. The second yoke end surface 402 may engage or contact a race of the bearing assembly 28', such as the inner race of the bearing assembly 28' when the yoke 32 is installed on the drive pinion 26.

The yoke hole 404 may be a through hole that may extend from the first yoke end surface 400 to the second yoke end surface 402. The shaft 102 of the drive pinion 26 may be received in the yoke hole 404. For instance, the spline 114 of the shaft 102 may be received in the yoke hole 404. As such, the yoke 32 may encircle the shaft 102.

The yoke spline 406 may be disposed in the yoke hole 404. The yoke spline 406 may include a plurality of teeth that extend toward the axis 50. The yoke spline 406 may mate or mesh with the spline 114 of the drive pinion 26 to inhibit rotation of the yoke 32 about the axis 50 with respect to the drive pinion 26.

A preload mechanism as described herein may allow a bearing preload to be set or adjusted from outside of a housing, such as from outside an assembled differential carrier. Such a configuration permits the bearing preload to be set or adjusted either during initial assembly or during maintenance or servicing without disassembly. The ability to set the bearing preload externally may allow the bearing preload force to be more accurately established either during initial assembly or during servicing since external adjustments are less intrusive and disturb fewer components as compared to disassembling a differential carrier to access an internal preload element such as a preload nut. Moreover, setting bearing preload externally may be significantly faster and less expensive as compared to configurations that require some degree of disassembly. Thus, the present invention facilitates faster, easier, and more accurate setting and adjustment of bearing preload and may help reduce warranty costs.

The preload mechanism as described above may eliminate the need for selectable shims that are used to set the bearing preload. For example, in a configuration in which the axial position of the outer races of two bearing assemblies are fixed, the bearing preload is set by modifying the relative axial positioning between the inner races of the two bearing assemblies. This may be accomplished by selecting an appropriate shim that may be provided between an inner race and the spacer that is disposed between the inner races. If an incorrect shim is selected (e.g., the shim is too thick or not thick enough), then the desired bearing preload force may not be obtained or maintained. As a result, the differential carrier must be disassembled so that the shim may be replaced with a shim having a different thickness that is believed will provide the appropriate bearing preload force after reassembly. Disassembly results in significant rework time and additional costs. Moreover, if the replacement shim is incorrect, then additional disassembles, shim replacement, and reassembly will be required. If the proper bearing preload is lost or not maintained in the field (e.g., after vehicle assembly or when the vehicle is in use), then the axle assembly will need to be disassembled so that the shim can be replaced, which can be even more difficult and costly. The present invention eliminates these issues and may allow a single standardized spacer to be provided between the inner races during initial assembly.

The preload mechanism as described above may allow a bearing preload to be set or adjusted in response to the replacement of adjustment of other components, such as a yoke that is installed on the shaft. For example, replacement of a yoke or tightening or loosening of a nut that secures the yoke may affect the bearing preload force in a configuration in which the yoke engages and can exert force on an inner race of a bearing assembly. The preload mechanism of the present invention allows the bearing preload force to be adjusted to accommodate variances that may result from installation or removal of the yoke or tightening or loosening of the nut that retains the yoke.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a housing;
    a shaft that is rotatable about an axis and disposed in the housing;
    a bearing assembly that encircles the shaft and that rotatably supports the shaft on the housing; and
    a preload mechanism that engages the bearing assembly, the preload mechanism including:
        a preload element that is disposed inside the housing and is rotatable about the axis; and
        an adjuster element that engages the preload element and is moveable along an adjuster element axis that differs from the axis to actuate the preload element and exert a preload force on the bearing assembly, wherein the adjuster element is disposed in a hole in the housing and is accessible from outside of the housing, wherein the housing is a differential carrier and the shaft is part of a drive pinion.

2. The axle assembly of claim 1 wherein the preload element is spaced apart from and does not contact the shaft.

3. The axle assembly of claim 1 wherein the preload element engages an outer race of the bearing assembly.

4. The axle assembly of claim 1 wherein the adjuster element axis is disposed substantially perpendicular to the axis.

5. The axle assembly of claim 1 wherein the preload element is moveable along the axis when the adjuster element is rotated about the adjuster element axis.

6. The axle assembly of claim 1 wherein the preload element encircles the axis.

7. The axle assembly of claim 1 wherein the housing defines a second hole that extends from the hole and the preload mechanism includes a second retainer that engages the adjuster element and inhibits axial movement of the adjuster element when the second retainer is received in the second hole in the housing.

8. The axle assembly of claim 7 wherein the second retainer is received in a recess in the adjuster element when the second retainer engages the adjuster element.

9. The axle assembly of claim 1 wherein the adjuster element is moveable along the adjuster element axis to actuate the preload element when the adjuster element is rotated about the adjuster element axis.

10. The axle assembly of claim 1 wherein the preload mechanism includes a first race that engages the bearing assembly and is spaced apart from the preload element and a rotatable bearing element that extends from the preload element to the first race.

11. The axle assembly of claim 10 wherein the first race includes a tab that extends away from the axis and that is received in a notch in the housing, wherein the tab and the housing cooperate to inhibit rotation of the first race about the axis in at least one rotational direction when the tab engages the housing.

12. The axle assembly of claim 10 wherein the rotatable bearing element is received in a groove in the preload element and in a groove in the first race.

13. The axle assembly of claim 10 wherein the preload mechanism includes a second race, wherein the preload element is axially positioned between the first race and the second race.

14. The axle assembly of claim 13 further comprising a second rotatable bearing element that extends from the preload element to the second race, wherein the preload element is spaced apart from the second race.

15. The axle assembly of claim 1 wherein the preload mechanism includes a second preload element that is positioned along the axis between the preload element and the bearing assembly.

16. The axle assembly of claim 15 wherein a first washer is disposed on an opposite side of the preload element from the second preload element and the first washer extends from the preload element to the housing.

17. The axle assembly of claim 15 wherein a second washer extends from the second preload element to the bearing assembly.

18. The axle assembly of claim 15 wherein the preload element has a preload element ramp that faces toward the second preload element, and the second preload element has a preload element ramp that faces toward the preload element, wherein rotation of the preload element causes the preload element ramp of the preload element to slide along the preload element ramp of the second preload element and actuates the second preload element along the axis to exert the preload force on the bearing assembly.

19. The axle assembly of claim 18 wherein the preload element has a second side that faces away from the second preload element, wherein the preload element ramp of the preload element is disposed in a nonparallel relationship with the second side.

20. The axle assembly of claim 19 wherein the preload element has a first flat and a second flat, the second flat is disposed closer to the second side than the first flat is disposed to the second side, and the preload element ramp of the preload element extends from the first flat to the second flat.

21. An axle assembly comprising:
a housing;
a shaft that is rotatable about an axis and disposed in the housing;
a bearing assembly that encircles the shaft and that rotatably supports the shaft on the housing;
a second bearing assembly that encircles the shaft and that rotatably supports the shaft on the housing; and
a preload mechanism that engages the bearing assembly, the preload mechanism including:
a preload element that is disposed inside the housing and is rotatable about the axis; and
an adjuster element that engages the preload element and is rotatable about an adjuster element axis that differs from the axis to actuate the preload element and exert a preload force on the bearing assembly, wherein the adjuster element is disposed in a hole in the housing and is accessible from outside of the housing, and the preload element is positioned along the axis between the bearing assembly and the second bearing assembly.

22. The axle assembly of claim 21 wherein the housing is a differential carrier and the shaft is part of a drive pinion.

23. The axle assembly of claim 21 wherein the preload element includes a threaded portion that faces away from the axis and mates with a threaded region of the housing.

24. The axle assembly of claim 23 wherein the preload element includes toothed portion that meshes with a drive gear of the adjuster element.

25. An axle assembly comprising:
a housing;
a shaft that is rotatable about an axis and disposed in the housing;
a bearing assembly that encircles the shaft and that rotatably supports the shaft on the housing; and
a preload mechanism that engages the bearing assembly, the preload mechanism including:
a preload element that is disposed inside the housing and is rotatable about the axis; and
an adjuster element that engages the preload element and is moveable along an adjuster element axis that differs from the axis to actuate the preload element and exert a preload force on the bearing assembly, wherein the adjuster element is disposed in a hole in the housing and is accessible from outside of the housing, wherein the preload mechanism includes a retainer that inhibits axial movement of the adjuster element when the retainer is received in the hole in the housing.

26. The axle assembly of claim 25 wherein the retainer has a thread that mates with a corresponding thread of the housing and engages a first end of the adjuster element when the retainer is received in the hole in the housing.

27. An axle assembly comprising:
a housing;
a shaft that is rotatable about an axis and disposed in the housing;
a bearing assembly that encircles the shaft and that rotatably supports the shaft on the housing; and
a preload mechanism that engages the bearing assembly, the preload mechanism including:
a preload element that is disposed inside the housing and is rotatable about the axis; and
an adjuster element that engages the preload element and is rotatable about an adjuster element axis that differs from the axis to actuate the preload element and exert a preload force on the bearing assembly, wherein the adjuster element is disposed in a hole in the housing and is accessible from outside of the housing, wherein the housing is a differential carrier and the shaft is part of a drive pinion.

* * * * *